United States Patent
Saito

(10) Patent No.: US 7,561,525 B2
(45) Date of Patent: Jul. 14, 2009

(54) WIRELESS COMMUNICATION SYSTEM, WIRELESS COMMUNICATION APPARATUS, WIRELESS COMMUNICATION METHOD, AND COMPUTER PROGRAM

(75) Inventor: Shin Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 278 days.

(21) Appl. No.: 11/150,229

(22) Filed: Jun. 13, 2005

(65) Prior Publication Data

US 2006/0013177 A1 Jan. 19, 2006

(30) Foreign Application Priority Data

Jul. 14, 2004 (JP) .............................. 2004-207714

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04B 3/36* (2006.01)
*H04B 7/14* (2006.01)

(52) U.S. Cl. ....................... 370/237; 370/229; 370/238; 455/7; 455/16

(58) Field of Classification Search ................. 370/338, 370/229, 237, 238, 254; 455/7, 9, 16
See application file for complete search history.

(56) References Cited

U.S. PATENT DOCUMENTS

| | | | |
|---|---|---|---|
| 6,711,137 B1 * | 3/2004 | Klassen et al. ............... | 370/252 |
| 6,738,352 B1 * | 5/2004 | Yamada et al. .............. | 370/238 |
| 6,965,568 B1 * | 11/2005 | Larsen ........................ | 370/238 |
| 6,990,080 B2 * | 1/2006 | Bahl et al. ................... | 370/254 |
| 7,230,924 B2 * | 6/2007 | Chiu et al. ................... | 370/237 |
| 2003/0174652 A1 * | 9/2003 | Ebata .......................... | 370/235 |
| 2004/0156345 A1 * | 8/2004 | Steer et al. ................... | 370/338 |
| 2005/0013253 A1 * | 1/2005 | Lindskog et al. ............ | 370/238 |
| 2005/0169183 A1 * | 8/2005 | Lakkakorpi et al. ......... | 370/238 |
| 2006/0098576 A1 * | 5/2006 | Brownrigg et al. .......... | 370/238 |

* cited by examiner

*Primary Examiner*—Nay A Maung
*Assistant Examiner*—Andrew Wendell
(74) *Attorney, Agent, or Firm*—Oblon, Spivak, McClelland, Maier & Neustadt, P.C.

(57) ABSTRACT

A wireless communication system for performing multi-hop transmission between stations includes: a requesting station for requesting multi-hop transmission; a destination station which receives the request from the requesting station; and neighbor stations, wherein the requesting station determines a communication capacity for each neighbor station and transmits a routing request message in which capacity information is described to each neighbor station, and based on the capacity information described in the routing request message received from each neighbor station, the destination station determines as to which routing request message to respond to and performs routing.

21 Claims, 13 Drawing Sheets

| TA | Type | NBOI/NBAI | TOIS | ALERT | TxNUM | Serial | ETC |

16Bits

FIG. 8

| NEIGHBORING LIST OF REQUESTING STATION S ||
|---|---|
| SECTION | LINK RATE |
| S—A | 50Mbps |
| S—B | 100Mbps |

| NEIGHBORING LIST OF COMMUNICATION STATION A ||
|---|---|
| SECTION | LINK RATE |
| A—S | 50Mbps |
| A—B | 150Mbps |
| A—C | 100Mbps |

| NEIGHBORING LIST OF REQUESTING STATION B ||
|---|---|
| SECTION | LINK RATE |
| B—S | 100Mbps |
| B—A | 150Mbps |
| B—E | 100Mbps |

| NEIGHBORING LIST OF COMMUNICATION STATION C ||
|---|---|
| SECTION | LINK RATE |
| C—A | 100Mbps |
| C—E | 200Mbps |
| C—D | 200Mbps |

| NEIGHBORING LIST OF REQUESTING STATION E ||
|---|---|
| SECTION | LINK RATE |
| E—B | 100Mbps |
| E—C | 200Mbps |
| E—D | 100Mbps |

| NEIGHBORING LIST OF COMMUNICATION STATION D ||
|---|---|
| SECTION | LINK RATE |
| D—C | 200Mbps |
| D—E | 100Mbps |

FIG. 9

| MESSAGE TYPE | INFORMATION ABOUT PATH SELECTION | NUMBER OF HOP COUNTS |
|---|---|---|
| ROUTING REQUEST MESSAGE ID |||
| COMMUNICATION PARTY (DESTINATION) ADDRESS |||
| COMMUNICATION PARTY (DESTINATION) SEQUENCE NUMBER |||
| ROUTING REQUEST TERMINAL (SOURCE) ADDRESS |||
| ROUTING REQUEST TERMINAL (SOURCE) SEQUENCE NUMBER |||

FIG. 11

| MESSAGE TYPE | INFORMATION ABOUT PATH SELECTION | NUMBER OF HOP COUNTS |
|---|---|---|
| ROUTING REQUEST MESSAGE ID | | |
| COMMUNICATION PARTY (DESTINATION) ADDRESS | | |
| COMMUNICATION PARTY (DESTINATION) SEQUENCE NUMBER | | |
| ROUTING REQUEST TERMINAL (SOURCE) ADDRESS | | |
| ROUTING REQUEST TERMINAL (SOURCE) SEQUENCE NUMBER | | |
| LIFE TIME | | |

WIRELESS COMMUNICATION SYSTEM, WIRELESS COMMUNICATION APPARATUS, WIRELESS COMMUNICATION METHOD, AND COMPUTER PROGRAM

CROSS REFERENCES TO RELATED APPLICATIONS

The present invention contains subject matter related to Japanese Patent Application JP 2004-207714 filed in the Japanese Patent Office on Jul. 14, 2004, the entire contents of which are incorporated herein by reference.

BACKGROUND OF THE INVENTION

1. Field of the Invention

The present invention relates to a wireless communication system for performing communication mutually among a plurality of wireless stations as in a wireless LAN (Local Area Network), a wireless communication apparatus for use therewith, a wireless communication method for use therewith, and a computer program for use therewith, and in particular relates to a wireless communication system in which each communication station performs network operations in an autonomously distributed manner without having a relationship between a control station and a controlled station, a wireless communication apparatus for use therewith, a wireless communication method for use therewith, and a computer program for use therewith.

More particularly, the present invention relates to a wireless communication system for performing multi-hop transmission from a communication station of a transmission source to a communication station of a transmission destination via one or more relay stations in a communication environment in which each communication station performs network operations in an autonomously distributed manner, a wireless communication apparatus for use therewith, a wireless communication method for use therewith, and a computer program for use therewith, and in particular relates to a wireless communication system for performing multi-hop transmission in accordance with a routing creation protocol in which the improvement in the frequency usage efficiency is set as metrics in a communication environment in which each communication station performs communication operations in an autonomously distributed manner, a wireless communication apparatus for use therewith, a wireless communication method for use therewith, and a computer program for use therewith.

2. Description of the Related Art

Examples of standard specifications relating to a wireless network include IEEE (The Institute of Electrical and Electronics Engineers) 802.11 (for example, refer to International Standard ISO/IEC 8802-11: 1999 (E) ANSI/IEEE Std 802.11, 1999 Edition, Part 11: Wireless LAN Medium Access Control (MAC) and Physical Layer (PHY) Specifications), Hiper LAN/2 (for example, refer to ETSI Standard ETSI TS 101 761-1 V1.3.1 Broadband Radio Access Networks (BRAN); HIPERLAN Type 2; Data Link Control (DLC) Layer; Part 1: Basic Data Transport Functions or ETSI TS 101 761-2 V1.3.1 Broadband Radio Access Networks (BRAN); HIPERLAN Type 2; Data Link Control (DLC) Layer; Part 2: Radio Link Control (RLC) sublayer), IEEE 802.15.3, and Bluetooth communication. Regarding IEEE 802.11 specifications, there exists extended specifications of IEEE 802.11a (for example, refer to Supplement to IEEE Standard for Information Technology-Telecommunications and Information Exchange between systems-Local and Metropolitan Area Networks-Specific Requirements-Part 11: Wireless LAN Medium Access Control (MAC) and Physical Layer (PHY) Specifications: High-speed Physical Layer in the 5 GHZ Band), IEEE 802.11b, and IEEE 802.11g due to a wireless communication system and differences in frequency bands.

In the wireless network, the communication range of each terminal is limited to a distance where radio waves reach. For this reason, a communication party is not typically within the communication range of the local station, presenting the problem in that the usage efficiency of the network is decreased. Therefore, it is considered that "multi-hop transmission" by which a large number of terminals are connected to one another without the intervention of access points is promising. According to multi-hop transmission, it is considered that the frequency usage efficiency can be increased.

When communication is performed among terminals on the basis of a multi-hop technique, for example, the terminal of the transmission source broadcasts packets in the communication range of the terminal itself. Hereinafter, another terminal that is able to receive the packets repeatedly performs the operation of further re-broadcasting the received packets in the communication range of the terminal itself until all the terminals receive the packets (for example, refer to U.S. Pat. No. 5,740,363).

A proposal has been made on traffic routing in a small-sized wireless data network (for example, refer to PCT Japanese Translation Patent Publication No. 2002-512479). In this case, in a node of the wireless network, when receiving data in which a route identifier and a route updating message are attached are relayed, a route table is updated on the basis of a route updating message attached to the received message data, a neighbor node from the route table is selected, the route identifier and the route updating message are replaced on the basis of the updated route table, and message data in which the replaced route identifier and the replaced updating message are attached is transferred to the neighbor node.

According to the multi-hop technique, the communication station of the transmission source performs communication via a peripheral station that exists in the neighborhood. As a result, when compared to the case in which communication is directly performed with a receiving station at a far distance, the transmission power is reduced, and communication with a communication station or an access point at a far distance becomes possible.

In order to construct a local area network by using wireless technology, in general, a method is used in which one apparatus serving as a control station called an "access point" or a "coordinator" is provided in the area, and a network is formed under the centralized control of this control station.

In the wireless network in which access points are arranged, when information is transmitted from a particular communication device, an access control method based on band reservation is widely adopted in which, first, a band necessary for the information transmission is reserved at the access point so as to use the transmission path so that a collision with information transmission from another communication device does not occur. That is, epoch-making wireless communication is performed such that, as a result of arranging access points, communication devices within the wireless network are synchronized with one another.

SUMMARY OF THE INVENTION

However, in a wireless communication system in which access points exist, when non-synchronous communication is performed between communication devices on the transmission side and on the receiving side, wireless communication via access points typically becomes necessary. Consequently, problems arise in that the usage efficiency of the transmission path is decreased by half.

In comparison, as another method of constructing a wireless network, "ad-hoc communication" in which terminals directly perform wireless communication in a non-synchronous manner has been devised. In particular, in a small-sized wireless network formed of a comparatively small number of clients positioned in the neighborhood, it is considered that ad-hoc communication in which any terminals can perform direct wireless communication, that is, random wireless communication without using a specific access point is appropriate.

Since a central control station does not exist in the ad-hoc wireless communication system, this is suitable for constructing a home network formed of, for example, household electrical devices. The ad-hoc network has features that the network does not easily break down since the routing is automatically changed even if one device fails or the power supply is switched off, and data can be transmitted comparatively far while the high-speed data rate is maintained by causing packets to hop a plurality of times between mobile stations. For the ad-hoc system, various development cases have been known (for example, refer to C. K. Tho, "Ad Hoc Mobile Wireless Network", Prentice Hall PTR).

Here, in an aspect where data transmission that is not limited to the communication range where radio waves of a communication station reach is performed, it is necessary to consider to apply the above-described multi-hop communication. In this case, it is necessary for each communication station to know the usage status of peripheral stations that should act as relay stations and to transmit a routing request message.

In a network where centralized management is performed by control stations such as access points, the usage status of each relay station can be known by the control station. However, when finding and selecting a path, since the communication station needs to exchange data with the control station, it takes time to determine the path. Furthermore, it is difficult to apply an algorithm for finding and selecting a path by using centralized management to an autonomously distributed network.

Most of existing routing protocols are being devised and formulated at IETF (Internet Engineering Task Force)-Manet-WG. Therefore, most wireless metrics (measurement reference) use information (receiving electric-field intensity, packet error, etc.) from the existing wireless system, and protocols that are devised by using the wireless permission information in the surrounding area in an autonomously distributed network as specific metrics in the routing mechanism are close to non-existent. As a result, the current situation is that the routing creation protocol for the purpose of increasing the frequency usage efficiency, which is the greatest advantage through multi-hop transmission, does not exist.

For example, in the routing method of an ad-hoc network, a node for relaying a path connection request message that is broadcast from the transmission source node performs a procedure for counting the number of receptions of path connection request messages and quantitatively knowing the degree of congestion of relay nodes, a procedure for setting the relay probability of the received path connection request messages on the basis of the counting results, and a procedure for selectively prohibiting the relay of each received path connection request message on the basis of the relay probability. Thus, the routing of the ad-hoc network in which narrowing of a communication band due to a path request message does not easily occur can be realized (for example, refer to Japanese Unexamined Patent Application Publication No. 2004-64678). However, in this case, although a path selection is made on the basis of the degree of congestion of the relay stations, routing for the purpose of increasing the frequency usage efficiency, which is the greatest advantage as a result of performing multi-hop transmission, is not performed.

It is desirable to provide a superior wireless communication system in which each communication station can perform network operations in an autonomously distributed manner without having a relationship between a control station and a controlled station, a superior wireless communication apparatus for use therewith, a superior wireless communication method for use therewith, and a superior computer program for use therewith.

It is desirable to provide a superior wireless communication system capable of suitably performing multi-hop transmission from a communication station of a transmission source to a communication station of a transmission destination via one or more relay stations in a communication environment in which each communication station performs communication operations in an autonomously distributed manner, a superior wireless communication apparatus for use therewith, a superior wireless communication method for use therewith, and a superior computer program for use therewith.

It is desirable to provide a superior wireless communication system capable of performing multi-hop transmission in accordance with a routing creation protocol in which the improvement in the frequency usage efficiency is set as metrics in a communication environment in which each communication station performs communication operations in an autonomously distributed manner, a superior wireless communication apparatus for use therewith, a superior wireless communication method for use therewith, and a superior computer program for use therewith.

According to an embodiment of the present invention, there is provided a wireless communication system for performing multi-hop transmission between stations, the wireless communication system including: a requesting station for requesting multi-hop transmission; a destination station which receives the request from the requesting station; and neighbor stations, wherein the requesting station determines a communication capacity for each neighbor station and transmits a routing request message in which capacity information is described to each neighbor station, and based on the capacity information described in the routing request message received from each neighbor station, the destination station determines as to which routing request message to respond to and performs routing.

The "system" referred to herein designates a logical assembly of a plurality of devices (or functional modules for realizing specific functions), and it is not essential that each device and each functional module be disposed in a single housing.

In the wireless communication system according to the embodiment of the present invention, coordinators are not particularly arranged. Each communication station broadcasts beacon information so as to enable the other communication stations in the neighborhood (that is, within the communication range) to know the existence of themselves and to report the network configuration. Furthermore, the communication station that newly joins the communication range of a particular communication station detects that it has entered the communication range by receiving a beacon signal and can know the network configuration by decrypting the information described in the beacon.

When communication stations do not exist in the neighborhood, the communication station can start to transmit a beacon at an appropriate timing. Hereinafter, the communication station that newly enters the communication range sets its own beacon transmission timing so that the beacon does not collide with the existing beacon arrangement. At this time, since each communication station obtains, for example, a priority usage area immediately after the beacon transmission, beacon arrangement is performed in accordance with an algorithm such that the beacon transmission timing of the newly joined station is sequentially set at random at a timing of nearly the center of the beacon duration set by the existing communication stations or is set completely at random.

In such an autonomously distributed wireless network, while each communication station directly (randomly) transmits information in accordance with an access procedure based on CSMA (Carrier Sense Multiple Access), each communication station can perform transmission control in which channel resources are effectively used by using transmission frames having a time-division multiple access structure (MAC) in loose synchronization by exchanging mutual beacon signals. In the latter case, each communication station can perform an access method based on time synchronization, for example, a band is reserved or a priority usage period is set.

Here, in order to perform data transmission that is not limited to the communication range where radio waves of the communication station reach, it is necessary to consider to apply multi-hop communication. However, in the network in which centralized management is performed by control stations, since the communication station needs to exchange data with the control station, it takes time to determine the path. Furthermore, it is difficult to apply the algorithm for performing routing selection by centralized management to an autonomously distributed network. Furthermore, a protocol for performing routing creation by using, as metrics, the increase in the frequency usage efficiency, which is the greatest advantage as a result of performing multi-hop transmission, does not exist, which is not efficient.

In comparison, according to the embodiment of the present invention, the requesting station determines a communication capacity for each neighbor station, and transmits a routing request message in which the capacity information is described to each neighbor station. Based on the capacity information described in the routing request message received from each neighbor station, the destination station determines as to which routing request message to respond to, and performs routing. Consequently, routing creation can be performed by using the increase in the frequency usage efficiency as metrics. Thus, a more efficient multi-hop transmission can be realized.

In the autonomously distributed network according to the embodiment of the present invention, with respect to media access control capable of using both a first-come first-served access method, such as CSMA, and a band reservation (or priority usage) transmission method, a path can be created by using, as a reference, the capacity of a wireless link in which the least reservable band is necessary. Furthermore, as a result of performing routing creation by using, as metrics, increasing the frequency usage efficiency, a more band range can be opened to CSMA-bases access. Therefore, it is possible to create a path by which the media usage efficiency is increased.

In the communication system according to the embodiments of the present invention, each communication station handles, as capacity information, effective rate information for each section that connects neighbor stations in the path. More specifically, the value such that the effective rate set with each neighbor station is multiplied by the amount of a vacant band is set as the communication capacity in each section.

The communication station receiving the routing request message that is not destined for the local station, serving as a relay station, updates the capacity information and transfers it to each neighbor station. At this time, the relay station multiplies the effective rate set with each neighbor station by the amount of the vacant band in order to compute the communication capacity in each section, and replaces it with the communication capacity computed in the local station when the first-mentioned computed communication capacity is smaller than the communication capacity described in the routing request message.

Furthermore, the communication station receiving the routing request destined for the local station, serving as a destination station, refers to the capacity information described in the routing request message received from each neighbor station, sends back a routing reply message with respect to the routing request message for which the band with the maximum capacity can be ensured, and creates a path with the requesting station.

More specifically, the destination station divides the communication capacity described in the routing request message received from each neighbor station by the number of hops, sends back a routing reply message with respect to the routing request message for which the capacity per hop becomes a maximum, and creates a path with the requesting station. That is, the destination station determines the path in which the described communication capacity among one or more routing request messages that arrived at the local station is greatest to be that the transmission path resources (band) are vacant at the greatest and the usage efficiency can be increased, selects that path, and sends back a response. A response message with respect to the routing request message backtracks the same path as that of the request message and reaches the requesting station. As a result, the path of the multi-hop transmission is determined.

The requesting station may transmit a routing request message in which the expected communication capacity is described. In such a case, the destination station waits for a predetermined time for the arrival of the routing request message in which the capacity information that satisfies the communication capacity expected by the requesting station is described. If the routing request message in which the capacity information that satisfies the communication capacity expected by the requesting station is described is received, a routing reply message with respect to the routing request message may be sent back, and a path may be created with the requesting station. As to whether or not a path having the expected communication capacity could be found may be determined by either the requesting station or the destination station.

Alternatively, when the destination station waits for the arrival of the routing request message and is difficult to receive the routing reply message in which the capacity information that satisfies the communication capacity expected by the requesting station is described, the destination station may dare not to form a path unintended for the requesting station by sending back a response message that the path that satisfies the request could not be found by using at least one of the routing request messages that could be received thus far.

According to another embodiment of the present invention, there is provided a computer program written in a computer-readable format so as to perform processing for performing communication operations in a communication environment in which multi-hop transmission is performed in a computer system, the computer program including the steps of: computing capacity information with each neighbor station; transmitting, to each neighbor station, a routing request message in which the capacity information determined for each neighbor station when operating as a requesting station for multi-hop transmission is described; updating the capacity information and transferring the routing request message to each neighbor station when a routing request message that is not destined for the local station is received; and referring to the capacity information described in the routing request message received from each neighbor station when a routing request message that is destined for the local station is received, sending back a routing reply message with respect to the routing request message for which a band with the largest capacity can be ensured, and creating a path with a requesting station.

The computer program according to the embodiment of the present invention is such that a computer program described in a computer-readable format is defined so as to realize predetermined processing in the computer system. In other words, as a result of installing the computer program according to the embodiment of the present invention into the computer system, coordinated operation is exhibited in the computer system, and it operates as a wireless communication apparatus. By constructing a wireless network by starting up a plurality of such wireless communication apparatuses, operational effects identical to those of the wireless communication system according to the embodiment of the present invention can be obtained.

According to the embodiments of the present invention, it is possible to provide a superior wireless communication system in which each communication station can perform network operations in an autonomously distributed manner without having a relationship between a control station and a controlled station, a superior wireless communication apparatus for use therewith, a superior wireless communication method for use therewith, and a superior computer program for use therewith.

According to the embodiments of the present invention, it is possible to provide a superior wireless communication system capable of suitably performing multi-hop transmission from a communication section of a transmission source to a communication section of a transmission destination via one or more relay stations in a communication environment in which each communication section performs communication operations in an autonomously distributed manner, a superior wireless communication apparatus for use therewith, a superior wireless communication method for use therewith, and a superior computer program for use therewith.

According to the embodiments of the present invention, it is possible to provide a superior wireless communication system capable of performing multi-hop transmission in accordance with a routing creation protocol in which the improvement in the frequency usage efficiency is set as metrics in a communication environment in which each communication station performs communication operations in an autonomously distributed manner, a superior wireless communication apparatus for use therewith, a superior wireless communication method for use therewith, and a superior computer program for use therewith.

In the autonomous distributed network according to the embodiments of the present invention, with respect to media access control capable of using both a first-come first-served access method such as CSMA, and a band reservation (or priority usage) transmission method, a path can be created by using, as a reference, the capacity of a wireless link in which the least reservable band is necessary. Therefore, by opening a more band range with respect to CSMA-based access, it is possible to create a path by which the media usage efficiency is increased.

When a path search protocol of the related art is applied to the wireless communication system that operates in an autonomously distributed manner by exchanging a beacon signal among communication stations, if a beacon is listened to by the other party, a path of one hop is created even if a path by which the band can be used widely by using multi-hop exists. In comparison, according to the path search mechanism according to the embodiments of the present invention, since a path by which the frequency usage efficiency is increased is found on the basis of the capacity information and is created, such problems can be avoided.

As a result of using the routing selection mechanism according to the embodiments of the present invention, a relay terminal in which the wireless usage is minimized without a complex control signal can be selected, and a more stable path selection can be realized.

As a result of using the routing selection mechanism according to the embodiments of the present invention, a path by which a necessary band can be realized without a complex control signal by considering the wireless rate information and the wireless usage status can be selected.

The routing mechanism according to the embodiments of the present invention, in which the improvement in the frequency usage efficiency is set as metrics, can be applied to every path search protocol.

BRIEF DESCRIPTION OF THE DRAWINGS

FIG. 8 shows effective rate information with each neighbor station, which is managed as capacity information in each section in each of the communication stations S and A to E;

FIG. 9 shows an example of the frame structure of an RREQ packet;

FIG. 11 shows an example of the frame structure of an RREQ packet;

DESCRIPTION OF THE PREFERRED EMBODIMENTS

Preferred embodiments of the present invention will now be described in detail below with reference to the drawings.

The transmission path for communication, which is assumed in the present invention, is wireless, and a network is constructed among a plurality of communication stations. Communication assumed in the embodiment of the present invention is store-and-forward switching traffic, and information is transferred in packet units. In the following description, for each communication station, a single channel is assumed to be used, but the case can be extended to a case in which a transmission medium formed of a plurality of frequency channels, that is, multiple channels, is used.

In the wireless network according to the embodiment of the present invention, each communication station directly (randomly) transmits information in accordance with an access procedure based on CSMA (Carrier Sense Multiple Access) and can construct an autonomously distributed wireless network.

In a wireless communication system in which control stations are not particularly arranged in this manner, each communication station enables the other communication stations in the neighborhood (that is, within the communication range) to know the existence of itself by broadcasting beacon information, and reports the network configuration. A communication station that newly enters the communication range of a particular communication station detects that it has entered the communication range by receiving a beacon signal and can know the network configuration by decrypting the information described in the beacon.

In the wireless network according to the embodiment of the present invention, transmission control is performed in which channel resources are effectively used by transmission frames having a time-division multiple access structure (MAC) by being mutually in time synchronization in a loose manner with one another by exchanging a beacon signal between the communication stations. Therefore, each communication station can perform an access method based on time synchronization, such as reserving a band or setting a priority usage period.

The processing in each communication station to be described in the following is basically processing to be performed by all the communication stations that join the network. However, depending on the case, not all the communication stations forming the network typically perform the processing described below.

A. Apparatus Configuration

Figure 1:
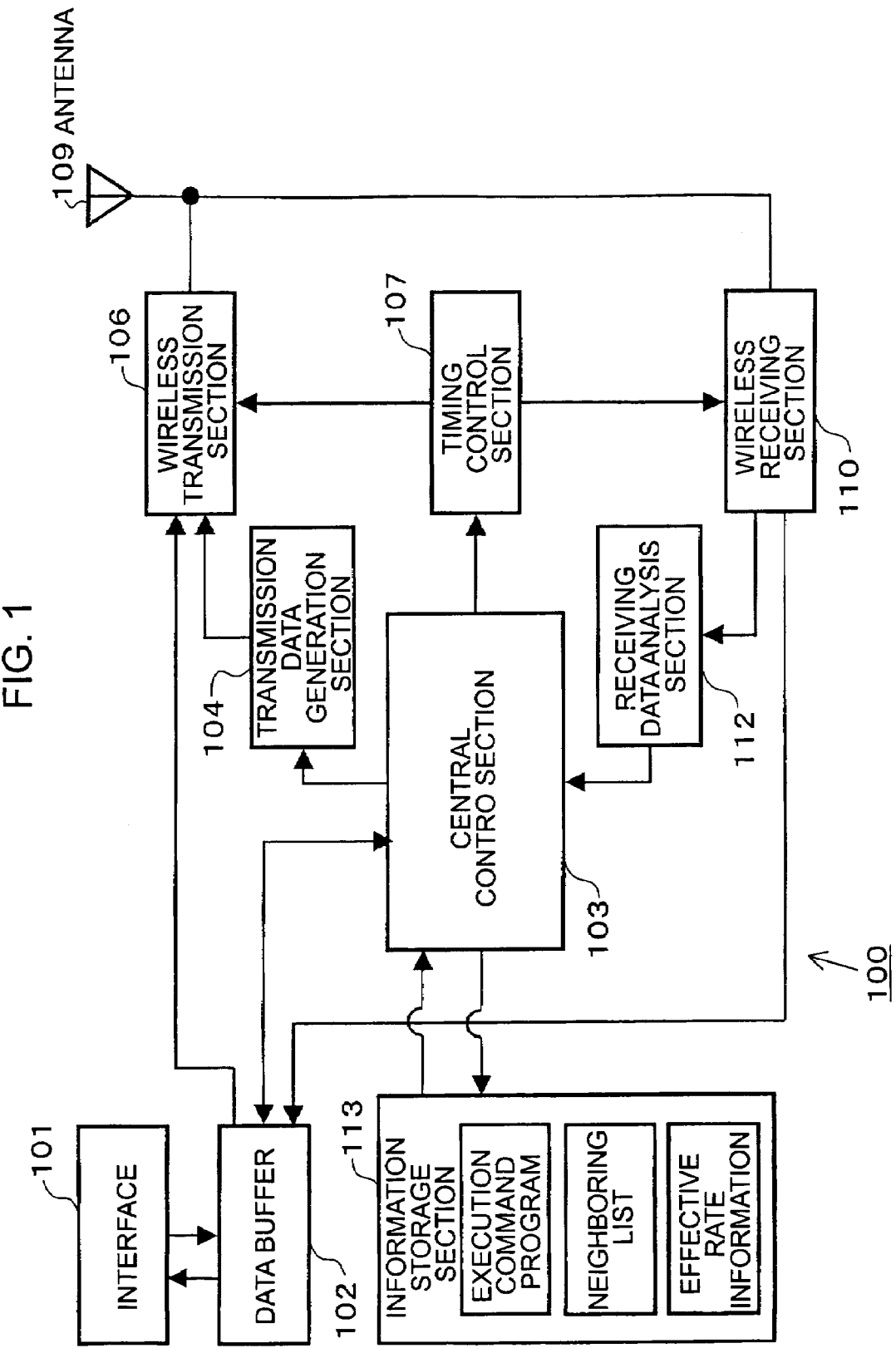
FIG. 1 is a schematic view showing the functional structure of a wireless communication apparatus that operates as a communication station in a wireless network according to an embodiment of the present invention.

FIG. 1 is a schematic view showing the functional structure of a wireless communication apparatus that operates as a communication station in a wireless network according to the embodiment of the present invention. A wireless communication apparatus 100 shown in FIG. 1 can form a network while avoiding collisions by effectively performing channel access in the same wireless system.

As shown in FIG. 1, the wireless communication apparatus 100 includes an interface 101, a data buffer 102, a central control section 103, a transmission data generation section 104, a wireless transmission section 106, a timing control section 107, an antenna 109, a wireless receiving section 110, a receiving data analysis section 112, and an information storage section 113.

The interface 101 exchanges various kinds of information with an external device (for example, a personal computer (not shown)) connected to the wireless communication apparatus 100.

The data buffer 102 is used to temporarily store data sent from a device connected via the interface 101 and data received via a wireless transmission path before it is sent via the interface 101.

The central control section 103 performs the management of a series of information transmission and reception processes in the wireless communication apparatus 100 and access control of a transmission path in a centralized manner. Basically, based on the CSMA procedure, access control is performed such that a backoff timer is made to operate over a random time while monitoring the status of the transmission path, and when a transmission signal does not exist during this period, a transmission right is acquired.

Furthermore, the central control section 103 manages the network on the basis of the neighboring list so that the wireless communication apparatus 100 avoids collisions of beacons through an autonomous communication operation. Furthermore, the central control section 103 periodically broadcasts beacon information and manages beacon information and is synchronized loosely with peripheral stations, so that access control based on time synchronization is realized, for example, a band is reserved or a priority usage period is set.

Furthermore, the central control section 103 performs a routing creation process by serving as a requesting station, a destination station, or a relay station in the multi-hop transmission. According to the multi-hop transmission, it is possible to perform data transmission that is not limited to the communication range where radio waves of the communication station reach. In this embodiment, a routing creation protocol is adopted in which the improvement in the frequency usage efficiency is set as metrics on the basis of the capacity information in each link section that connects neighbor stations. For such a routing creation process, the central control section 103 manages, as the capacity information, the effective rate information set with each neighbor station. However, the details of the routing creation algorithm will be described later.

The transmission data generation section 104 generates a packet signal and a beacon signal transmitted from the local station to a neighbor station. Examples of packets referred to herein include a data packet, a transmission request packet RTS of the communication station of the receiving destination, a confirmation response packet CTS with respect to the RTS, an ACK packet, a routing request packet, and a routing reply packet. For example, for the data packet, transmission data stored in the data buffer 102 is extracted by the amount of a predetermined length, and by using this data as a payload, packets are generated.

The wireless transmission section 106 includes a modulator for modulating a transmission signal by a predetermined modulation method, such as OFDM (Orthogonal Frequency Division Multiplexing), a D/A converter for converting a digital transmission signal into an analog signal, an up converter for frequency-converting and up-converting an analog transmission signal, and a power amplifier (PA) for amplifying the electrical power of the up-converted transmission signal (neither of which is shown in the figure). The wireless transmission section 106 performs a wireless transmission process on a packet signal at a predetermined transmission rate.

The wireless receiving section 110 includes a low-noise amplifier (LNA) for voltage-amplifying a signal received from another station via the antenna 109, a down converter for frequency-converting and down-converting the voltage-amplified received signal, an automatic gain controller (AGC), an A/D converter for converting an analog received signal into a digital form, and a demodulator for performing a demodulation process on the basis of a synchronization process for synchronization acquisition, channel estimation, OFDM, etc. Furthermore, in this embodiment, the wireless receiving section 110 determines the effective rate in the link to each neighbor station on the basis of a received signal such as beacons and packets received from the neighbor station, the signal intensity thereof, an S/N ratio, and an error rate.

The antenna 109 wirelessly transmits a signal to another wireless communication apparatus in a predetermined frequency channel or collects a signal sent from another wireless communication apparatus. In this embodiment, it is assumed that a single antenna is provided and it is difficult to perform transmission and reception in parallel.

The timing control section 107 controls the timing for transmitting and receiving a wireless signal. For example, the control of the timing of transmitting its own packets and the timing of transmitting each packet (RTS, CTS, data, ACK, etc.) compliant with the RTS/CTS method (the frame interval IFS from when the immediately previous packet is received until the local station transmits packets, setting of backoff during competition transmission, etc.), and timing control for setting NAV when packets destined for another station are received and for transmitting and receiving a beacon, are performed.

The receiving data analysis section 112 analyzes a packet signal (including the analysis of the RTS and CTS signals) that could be received from another station, and a beacon signal.

The information storage section 113 stores an execution procedure command program for a series of access control operations performed in the central control section 103, and information obtained from the results of the analysis of the received packets and beacons, etc. For example, the information (a neighboring list such as NBOI (to be described later), and effective rate information with respect to the neighbor station) of neighboring apparatuses, which is obtained by analyzing the beacon, is stored in the information storage section 113, and is used as appropriate in a communication operation control process for a transmission and reception operation timing, a beacon generation process, and a routing creation process during multi-hop transmission.

B. Construction of Autonomously Distributed Network on the Basis of the Exchange of Beacon Information In the autonomously distributed network according to this embodiment, each communication station broadcasts beacon information at predetermined time intervals in a predetermined channel in order to enable the other communication stations in the neighborhood (that is, in the communication range) to know the existence of themselves and to report the network configuration. The transmission frame period at which a beacon is transmitted is defined here as a "super frame", and one super frame is set to, for example, 40 milliseconds.

A newly joined communication station detects that it has entered the communication range while listening to a beacon signal from a peripheral station through a scanning operation and can know the network configuration by decrypting the information described in the beacon. Then, the communication station sets the beacon transmission timing of the local station to a timing at which a beacon is not transmitted from the peripheral station while being loosely in synchronization with the beacon receiving timing.

In the wireless network according to this embodiment, while each communication station directly (randomly) transmits information in accordance with the CSMA-based access procedure, the communication station achieves mutual time synchronization by mutually broadcasting a beacon, and the communication station performs transmission control in which channel resources are effectively used by using a transmission frame having a moderate time-division multiple access structure (MAC). In this case, each communication station can perform an access method based on time synchronization, for example, a band is reserved or a priority usage period is set.

The beacon transmission procedure of each communication station according to this embodiment is described below with reference to FIG. 2.

Communication stations are loosely synchronized with one another while listening to a beacon transmitted in the surrounding area. When a communication station newly appears, the new communication station sets its own beacon transmission timing so that it does not collide with the beacon transmission timing of the existing communication stations.

When a communication station does not exist in the surrounding area, a communication station 01 can start to transmit a beacon at an appropriate timing. The beacon transmission interval is 40 milliseconds. In the example shown in the topmost stage in FIG. 2, B01 indicates a beacon transmitted from the communication station 01.

Hereinafter, the communication station that newly enters the communication range sets its own beacon transmission timing so that the beacon does not collide with the existing beacon arrangement.

Figure 2:
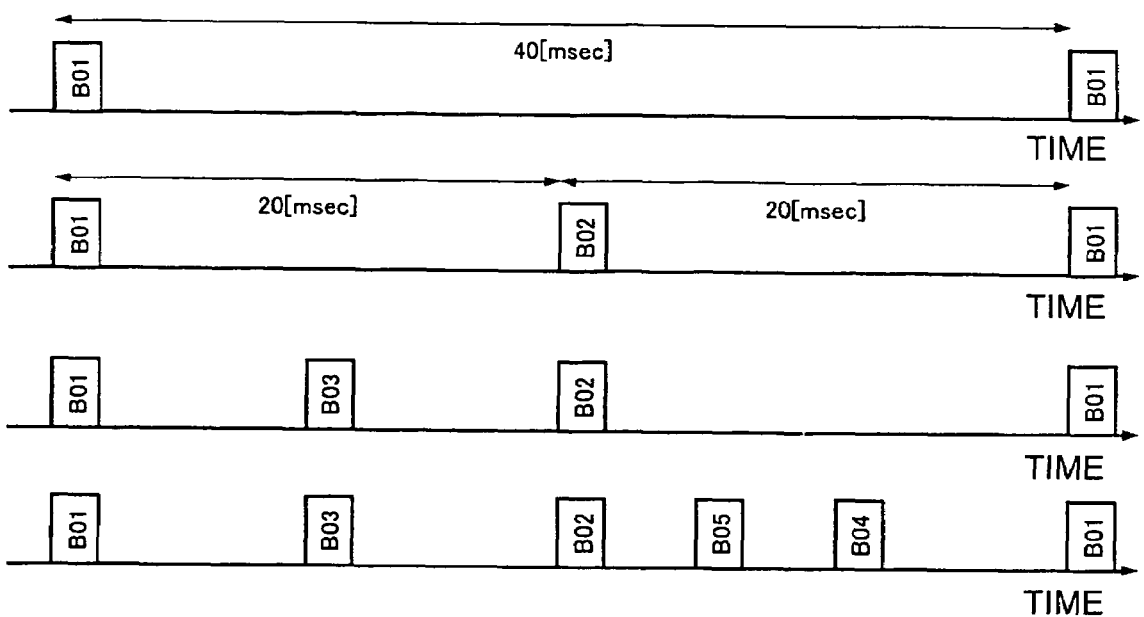
FIG. 2 illustrates a beacon transmission and reception procedure of each communication station in an autonomously distributed network.

For example, as shown in the topmost stage in FIG. 2, in the channel where only the communication station 01 exists, it is assume d that a new communication station 02 appears. At this time, the communication station 02 recognizes the existence of the communication station 01 and the beacon position by receiving the beacon from the communication station 01. As shown in the second stage of FIG. 2, the communication station 02 sets its own beacon transmission timing so that the beacon does not collide with the beacon of the communication station 01 and starts to transmit a beacon.

Furthermore, it is assumed that a new communication station 03 appears. At this time, the communication station 03 receives at least one of the beacons transmitted from each of the communication station 01 and the communication station 02, and recognizes the existence of these existing communication stations. Then, as shown in the third stage of FIG. 2, the communication station 03 starts to transmit a beacon at a timing at which the beacon does not collide with the beacon transmitted from the communication station 01 and the communication station 02.

Hereinafter, each time a communication station newly enters in the surrounding area in accordance with the same algorithm, the beacon interval becomes narrower. For example, as shown in the bottommost stage of FIG. 2, a communication station 04 that appears next sets its own beacon transmission timing so that the beacon does not collide with the beacon transmission timing set by each of the communication station 01, the communication station 02, and the communication station 03. Furthermore, a communication station 05 that appears next sets its own beacon transmission timing so that the beacon does not collide with the beacon transmission timing set by each of the communication station 01, the communication station 02, the communication station 03, and the communication station 04.

However, a minimum beacon interval $B_{min}$ is defined so that beacons do not overflow in the band (the super frame), and it is not permitted that two or more beacon transmission timings are arranged within $B_{min}$. For example, when a minimum beacon interval $B_{min}$ is defined as 625 microseconds in the super frame of 40 milliseconds, only up to 64 communication stations can be contained in the range where radio waves reach.

When a new beacon is arranged in the super frame, each communication station obtains a priority usage area (TPP) immediately after the beacon is transmitted (to be described later). Therefore, in one channel, preferably, the beacon transmission timing is uniformly distributed within the super frame period more than it is congested from the viewpoint of transmission efficiency. However, in order that the beacon transmission timing be uniquely determined, for example, when its own beacon transmission timing is determined so that the transmission of the beacon is started nearly in the center of the time range where the beacon interval is the longest in the range where the station itself can listen to, the peripheral station also determines the beacon transmission timing by the same method. Therefore, there is the possibility that the frequency at which the beacon transmitted from the peripheral station collides with its own beacon increases. Therefore, in one channel, the beacon transmission timing being uniformly distributed within the super frame period is more preferable than the beacon is congested from the viewpoint of transmission efficiency.

Figure 3:
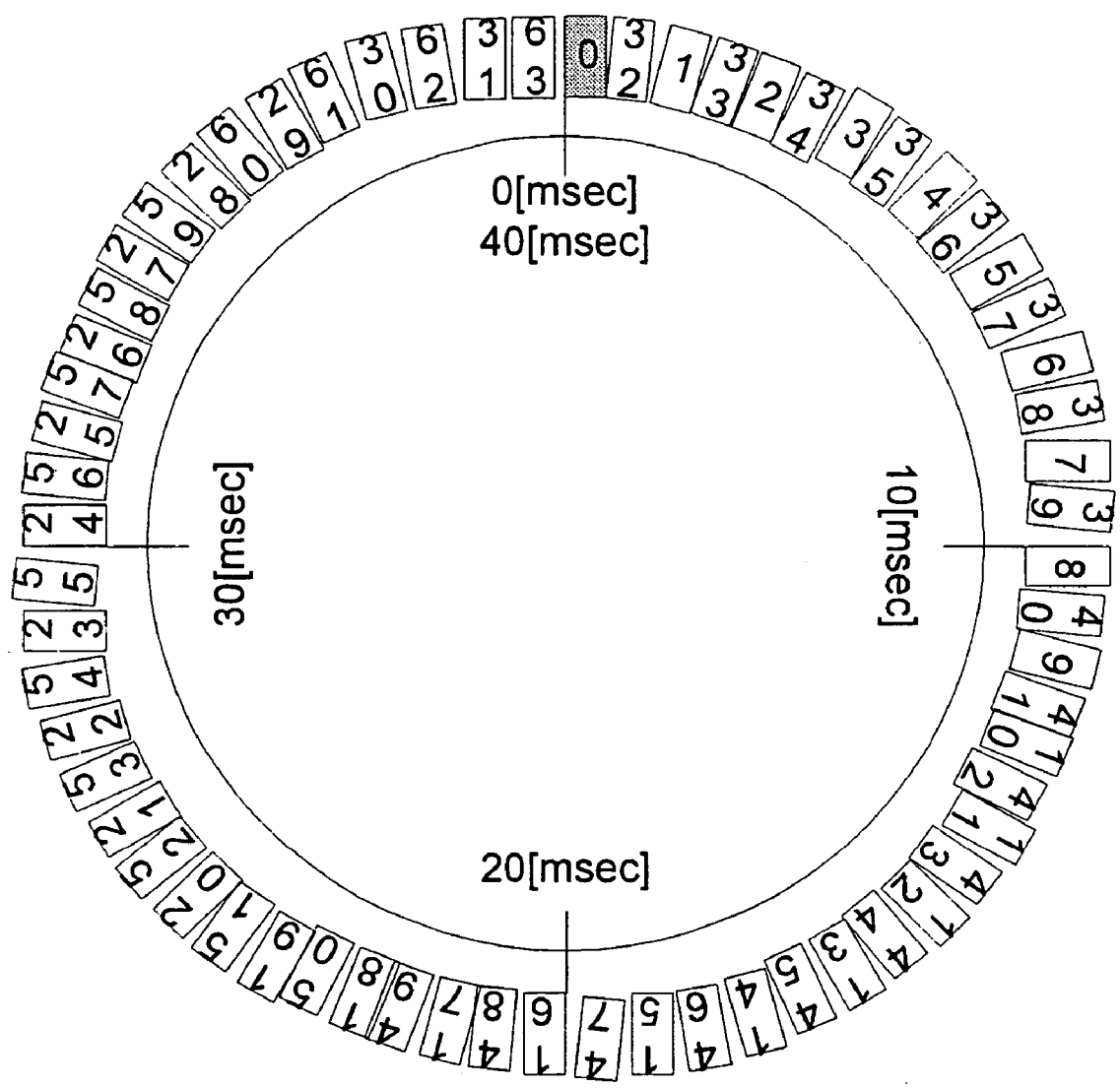
FIG. 3 shows an example of the structure of a beacon transmission timing (TBTT), the beacon being capable of being arranged in a super frame.

FIG. 3 shows an example of the structure of a beacon transmission timing (TBTT) at which the beacon can be arranged in the super frame. The position at which the beacon can be arranged is also called a "slot". However, in the example shown in FIG. 3, the passage of time in the super frame of 40 milliseconds is indicated like a clock such that the hour hand moves in the clockwise direction in a circular ring.

Although not shown in FIGS. 2 and 3, each beacon is transmitted intentionally at a time with a slight time offset from the TBTT (Target Beacon Transmission Time), which is the transmission time of each beacon. This is called a "TBTT offset". In this embodiment, the TBTT offset value is determined by a pseudo-random number. This pseudo-random number is determined by a pseudo-random sequence TOIS (TBTT Offset Indication Sequence) that is determined uniquely, and the TOIS is updated for each super frame.

As a result of providing the TBTT offset, even when two communication stations arrange beacon transmission timings in the same slot in the super frame, the actual beacon transmission time can be shifted. Thus, even if beacons collide with each other in a particular super frame, in another super frame, the communication stations can listen to the mutual beacons (or the communication stations in the neighborhood listen to the beacons of both of them). The communication station reports the TOIS set for each super frame to the neighbor stations in such a manner that it is contained in the beacon information (to be described later).

In this embodiment, when each communication station does not transmit and receive data, each communication station is obliged to perform a receiving operation before and after the beacon transmitted by the local station. Even when the data transmission and reception are not performed, each communication station is obliged to confirm whether there is a change in the presence of the beacon in the surrounding area or the TBTT of each peripheral station is not shifted by causing a receiver to operate continuously over one super frame once every few seconds in order to perform a scanning operation. When a shift is confirmed in the TBTT, a shift in which $-B_{min}/2$ milliseconds or less is specified as the TBTT by using a TBTT group recognized by the local station is defined as "proceeding", and a shift in which $+B_{min}/2$ milliseconds or less is specified as a TBTT by using a TBTT group recognized by the local station is defined as "delayed". The time is corrected in accordance with the most delayed TBTT. The details of such a method of acquiring the synchronization of the time slot timing with peripheral stations are described in Japanese Patent Application No. 2004-31414 that has already been assigned to the applicant of the present invention.

Figures 4, 5:
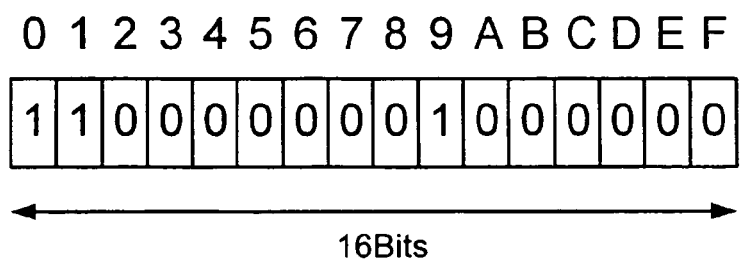
FIG. 4 shows an example of the format of a beacon frame.
FIG. 5 shows an example of the description of NBOI.

FIG. 4 shows an example of a format of a beacon frame transmitted in an autonomously distributed wireless communication system according to this embodiment.

In the example shown in FIG. 4, the beacon contains a TA (Transmitter Address) field that uniquely indicates the transmission source station, a Type field that indicates the type of the beacon, an NBOI/NBAI (Neighboring Beacon Offset Information/Neighboring Beacon Activity Information) field, which is the receiving time information of a beacon that can be received from the peripheral station, a TOIS (TBTT Offset Indication Sequence) field, which is information indicating the TBTT offset value (described above) in the super frame in which the beacon is transmitted, an ALERT field for storing the information of the change of the TBTT and other various kinds of information to be transmitted, a TxNum field indicating the amount in which the resources are allocated with priority by the communication station, and a Serial field indicating an exclusive unique serial number that is assigned to the beacon when a plurality of beacons are transmitted in the associated super frame.

In the Type field, the type of the beacon is described in a bit-map format of 8 bits long. In this embodiment, as information for identifying which one of a "regular beacon" that is transmitted once by each communication station at the beginning for each super frame and an "auxiliary beacon" that is transmitted to obtain a priority transmission right the beacon is, it is indicated by using a value from 0 to 255 indicating the priority. More specifically, in the case of a regular beacon that is necessary to be transmitted once for each super frame, 255 indicating the highest priority is assigned, and one value of 0 to 254 corresponding to the priority of the traffic is assigned to the auxiliary beacon.

The NBOI field contains information such that the position (the received time) of the beacon of the neighbor station, which can be received by the local station within the super frame. In this embodiment, since, as shown in FIG. 3, a slot in which a maximum of 64 beacons can be arranged in one super frame, the information about the arrangement of the beacon slot of the beacons that could be received is described in a bit-map format of 64 bits long. That is, the transmission time TBTT of the regular beacon of the local station is mapped on the beginning bit (MSB) of the NBOI field, and each of the other slots is mapped on the bit position corresponding to the relative position (offset) in which the TBTT of its own station is used as a reference. Then, "1" is written into the bit position that is assigned to each slot of the transmission beacon of the local station and the beacon that can be received, and the bit positions other than that is kept as "0".

FIG. 5 shows an example of the description of an NBOI. The NBOI is formed of 64 bits, which corresponds to the number of beacons that can be arranged in the super frame. Here, for the sake of simplicity of the drawings, it is assumed that each of the communication stations 0 to F sets TBTT in the corresponding slots capable of housing a maximum of 16 stations. In the example shown in FIG. 5, the communication station 0 forms an NBOI field such as "1100, 0000, 0100, 0000". This means that the communication station 0 announces that "the beacon from the communication station 1 and the communication station 9 can be received". That is, when the beacon can be received, a mark is assigned to each bit of the NBOI corresponding to the relative position of the received beacon, and a space is assigned thereto when the beacon is not received. The reason why the MSB is "1" is that the local station has transmitted a beacon, and a mark is assigned to the place corresponding to the time at which the local station has transmitted a beacon.

When each communication station receives a mutual beacon signal in a particular channel, based on the description of the NBOI contained therein, each communication station can arrange its own beacon transmission timing while avoiding the collision of beacons in the channel and can detect the beacon receiving timing from the peripheral station.

For an NBAI field, an NBAI field is set in the frame format of the beacon for the purpose of reducing a hidden terminal of beacon reception. Information for specifying "the beacon for which the local station has actually performed a reception process" is described at the format identical to that of the NBOI field. In the NBAI field, bits are arranged by using the transmission time of the regular beacon of the local station as a reference at the format identical to that of the NBOI field, and information for specifying the TBTT at which the local station has actually performed a reception process is described in a bit-map format.

In a TOIS field, a pseudo-random sequence for determining the above-mentioned TBTT offset is stored, and it indicates as to how much of the TBTT offset the associated video is transmitted with. As a result of providing the TBTT offset, even when two communication stations arrange a beacon transmission timing in the same slot in the super frame, the actual beacon transmission time can be shifted. Thus, even if beacons collide with each other in a particular super frame, in another super frame, the communication stations can listen to the mutual beacons (or the communication stations in the neighborhood listen to the beacons of both of them).

Figure 6:
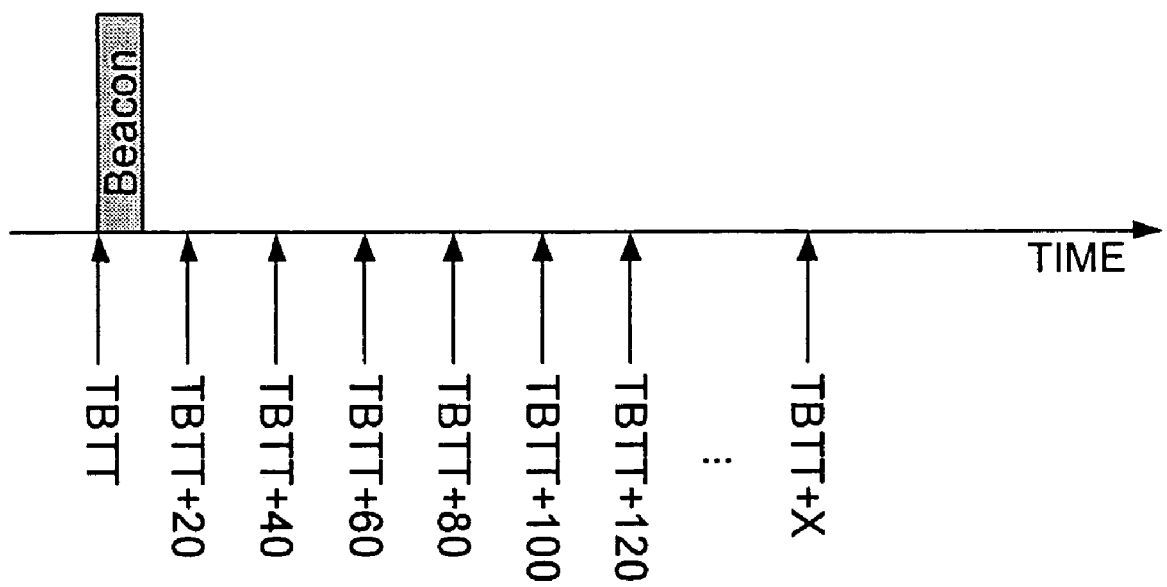
FIG. 6 shows the relationship between a TBTT and an actual beacon transmission time.

FIG. 6 shows a TBTT and an actual beacon transmission time. As shown in FIG. 6, when the TBTT offset is defined so that the time becomes one of TBTT, TBTT+20 microseconds, TBTT+40 microseconds, TBTT+60 microseconds, TBTT+80 microseconds, TBTT+100 microseconds, and TBTT+120 microseconds, it is determined as to at which TBTT offset the beacon is transmitted for each super frame, and the TOIS is updated. When it is difficult to transmit the beacon at the time intended by the transmission station, all zeros are stored in the TOIS, so that the fact that the beacon transmission timing for this time could not be performed at the intended time is transmitted to peripheral stations capable of receiving the beacon.

In an ALERT field, information to be transmitted to the peripheral stations in an abnormal state is stored. For example, when the TBTT of the regular beacon of the local station is to be changed for the purpose of avoiding collisions of beacons or when the request of stopping the transmission of an auxiliary beacon is to be made to the peripheral stations, the fact is described in the ALERT field.

In a TxNum field, the number of auxiliary beacons transmitted by the associated station in the super frame is described. Since the communication station is given a TPP, that is, a priority transmission right following the transmission of the beacon, the number of auxiliary beacons in the super frame corresponds to the time ratio at which resources are allocated with priority and transmissions are performed.

In a Serial field, an exclusive unique serial number assigned to the associated beacon when a plurality of beacons are transmitted in the associated super frame is written. As the serial number of the associated beacon, an exclusive unique number is described in each beacon transmitted into the super frame. In this embodiment, information as to at what sequence position of the TBTT the auxiliary beacon is transmitted by using the regular beacon of the local station as a reference is described.

Furthermore, an ETC field for describing information other than the above is provided.

After the power supply is switched on, first, the communication station tries a scanning operation, that is, reception of a signal continuously over the length of the super frame or more in order to confirm the existence of a beacon transmitted by the peripheral stations. In this process, when a beacon is not received from the peripheral stations, the communication station sets an appropriate timing as a TBTT.

On the other hand, when the beacon transmitted from the peripheral station is received, by computing the logical OR by shifting the NBOI field of each beacon received from the peripheral station in accordance with the beacon received time and by referring to it, a beacon transmission timing is extracted from the timing corresponding to the bit position that is not marked finally.

As a result of computing the OR of the NBOI obtained from the beacon received from the peripheral station, the beacon transmission timing is determined from the space portion.

However, when the TBTT duration at which the run length of space becomes a maximum is smaller than the minimum TBTT duration (that is, equal to or smaller than $B_{min}$), it is difficult for the new communication station to join this system.

C. Multi-Hop Transmission

In the wireless communication system according to the embodiment of the present invention, in the above-described autonomously distributed network configuration, a multi-hop transmission method for transmitting data from a communication station of a transmission source to a communication station of a transmission destination via one or more relay stations is adopted. According to the multi-hop transmission, data transmission that is not limited to the communication range-where radio waves of a communication station reach can be performed. In this case, the communication station that requests multi-hop transmission needs to know the usage status of peripheral stations that should act as relay stations and to transmit a routing request message. In the multi-hop transmission according to the embodiment of the present invention, a protocol for performing routing creation in which the improvement in the frequency usage efficiency is set as metrics is adopted. In the following, the procedure for determining a communication path is described in detail.

Figure 7:
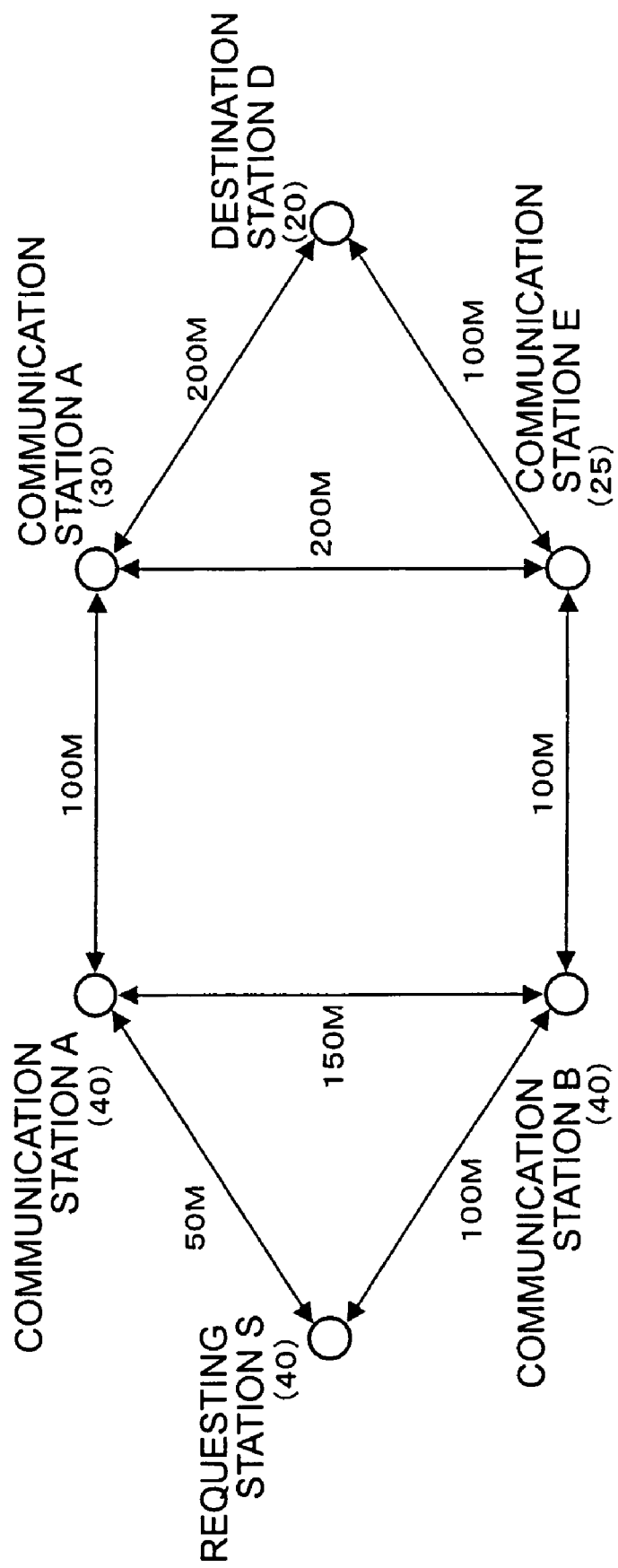
FIG. 7 shows the configuration of a communication system in which a plurality of communication stations A, B, C, and E that can serve as relay stations are arranged between a communication station S serving as a requesting station for multi-hop transmission and a communication station D serving as a destination station.

Here, the communication environment shown in FIG. 7 is assumed. In FIG. 7, a communication system is formed of a communication station S serving as a requesting station for requesting multi-hop transmission, a communication station D serving as a destination station for multi-hop transmission, and a plurality of communication stations A, B, C, and E, which are disposed between the communication stations S and D and which can act as relay stations. In FIG. 7, the numeral described in the link that connects between the communication stations indicates an effective rate [Mbps], and the numeral in the parentheses, which is assigned to the communication station, indicates the number of vacant slots (a maximum of 64 slots in this embodiment) as the amount of band that can be used by the communication station.

As shown in FIG. 8, it is assumed that the communication stations S and A to E manage the effective rate information with each neighbor station as the capacity information in each section. The effective rate is determined on the basis of the channel characteristics between neighbor stations. For example, the communication station can estimate the channel characteristics by using the beacon and the preamble portion of the packet, and based on the channel information, a coding method and a transmission rate are determined. It is assumed that a scheme (for example, described in the PHY header) by which the coding method and the transmission rate to be used are recognized between the neighbor stations is provided.

As can also be seen from FIG. 8, the effective rate is set to various values for each section. In other words, the communication capacity for each section is not uniform. For this reason, when the path from the requesting station S to the destination station D is considered, the communication capacity is not typically large even if the number of hops is small. Furthermore, although the communication capacity is large in most sections in the path, when a section having a smaller communication capacity partially is contained, the communication capacity becomes smaller as the entire path. In this embodiment, since a path selection in which the frequency usage efficiency is set as metrics is made, the communication capacity per hop, which is obtained by dividing the minimum communication capacity possessed by each path by the number of hops of that path, is handled as the capacity information of the path.

A description is given below of the processing procedure for determining the path from the requesting station S to the destination station D on the basis of the effective rate information for each neighbor station of each communication station in the communication system shown in FIG. 7.

Processing (1): Initial Processing and Transmission of Routing Request from the Requesting Station S (1-1) All the communication stations S and A to E forming the associated communication system refer to the beacon information (for example, NBOI (see FIG. 5)) listened to from all the neighbor stations of the local station, check the number N of vacant slots as the band that can be used by the communication stations themselves, and store it. Then, the wireless capacity value with each neighbor station (that is, for each section) is calculated in accordance with the following equation.

$$\text{PHY-rate} \times \text{efficiency} \alpha \text{ (overhead factor)} \times \text{the number } N \text{ of vacant beacon slots} = \text{wireless capacity}$$

(1-2) The communication station S serving as a requesting station for multi-hop transmission stores, in all the neighbor station destinations, the information about the computed wireless capacity of each section as the information about the path selection of a RREQ (Routing Request Message) packet as a routing request message, and transmits it as a multiple-unicast packet.

In the case of the communication system configuration shown in FIG. 7, the requesting station S transmits an RREQ packet to the communication A and the communication station B serving as neighbor stations.

FIG. 9 shows an example of the frame structure of an RREQ packet. In the example shown in FIG. 9, the frame structure has a message type field indicating that the associated packet is a routing request message RREQ; an information field for the path selection in which the wireless capacity used for selecting the path is described; a number-of-hop-counts field for counting the number of hops in the associated path and describing it; a routing request message ID field for describing the information for identifying the associated message; a communication party (destination) address field for describing information about the requesting station; a communication party (destination) sequence number field; a routing request terminal (source) address field for identifying the routing requesting station; and a routing request terminal (source) sequence number field.

Processing (2): Processing in the Relay Station (2-1) Next, when the communication station A and the communication station B, which are the neighbor stations of the requesting station S receive a routing request RREQ that is not destined for the communication station itself from the requesting station S, the wireless capacity of the requesting station S, which is described in the information field about the path selection of each received routing request packet, is compared with the wireless capacity of the communication station itself. Here, when the wireless capacity possessed by the local station with respect to the neighbor station is smaller, it is rewritten into the value of the information field for the path selection, and a routing request packet destined for each neighbor station is generated. At this time, the number of hop counts is incremented by 1.

(2-2) Hereinafter, the communication A and the communication station B may receive a routing request packet through another path from the same path requesting party. In order to prevent the transfer of the routing request packet from the same path requesting party from being repeated and from overflowing in the medium, individual timers 1 are started up, and the period in which those packets can be received is set. Of course, by using other means, it may be avoided that the routing request packet of the same message ID from the same path requesting party is received two or more times through another path.

(2-3) Next, in order to create a reverse path for the transmission party of the routing request packet, the transmission party (the requesting station S for the communication station A) address of the sent RREQ packet is stored as Next Hop (the next hop destination) in the memory. If the set value of the timer 1 is exceeded, the routing request packet of the same ID from the requesting party of the same RREQ packet is discarded hereafter.

Processing (3): Processing in the Destination Station D and the Relay Station (3-1) Next, the node receiving the routing request RREQ destined for its own adopts the same procedure as the above-described (2-2) and (2-3).

(3-2) The timer 2 divides the maximum value of the wireless capacity by the number of hop counts when a particular time is exceeded and selects the maximum capacity per hop.

Figure 10:
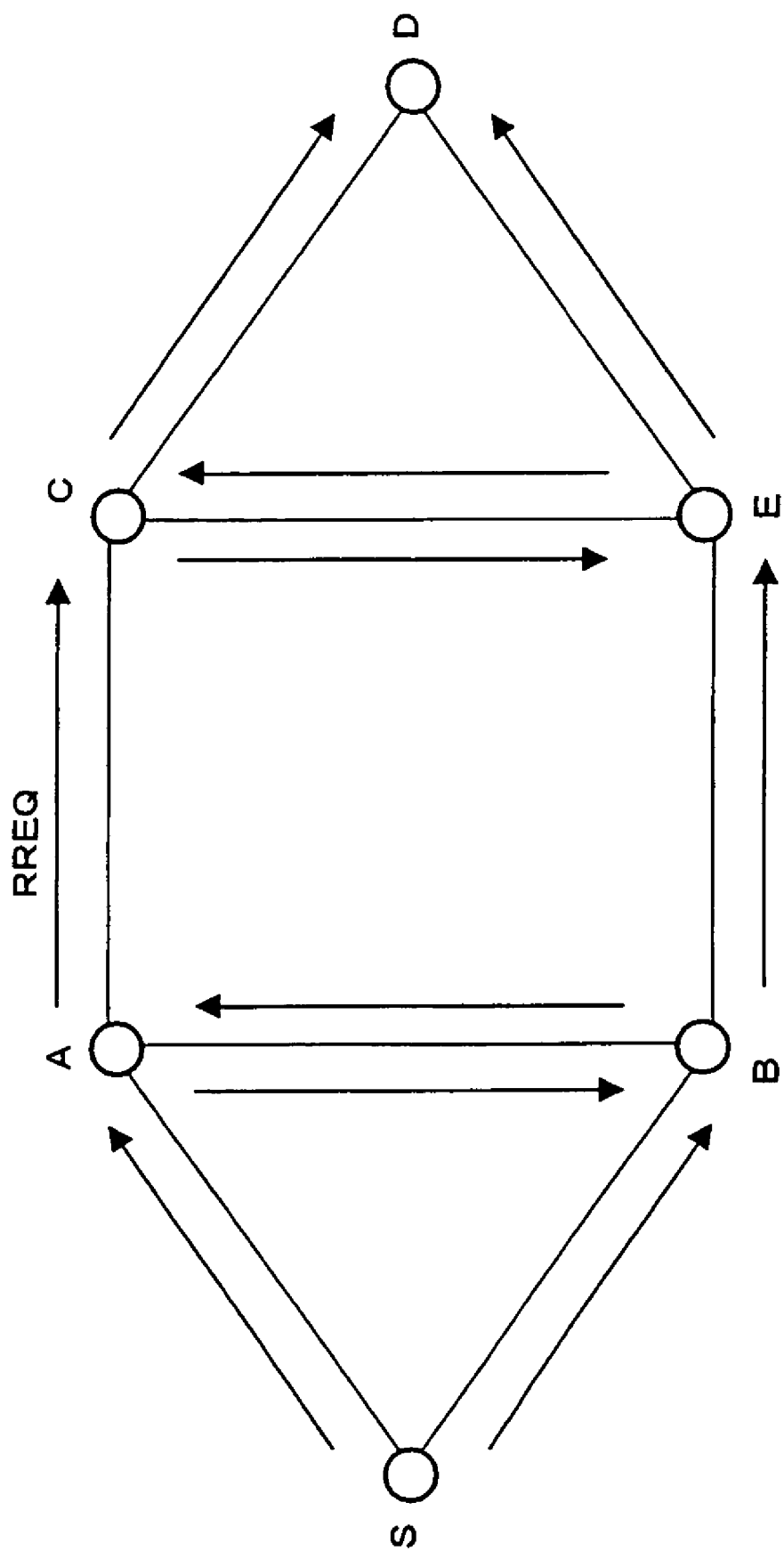
FIG. 10 shows a path when the creation of a path is requested in the communication system shown in FIG. 7.

(3-3) When this procedure is performed in the communication system configuration: shown in FIG. 7, as described below, the results of the calculation of the capacity value for each path are obtained. FIG. 10 shows a path when the creation of a path is requested in the communication system shown in FIG. 7.

Path 1: requesting station S→capacity
2G→communication station A→capacity
4G→communication station C→capacity
6G→destination station D: a minimum capacity value 2G number of hop counts 3

Path 2: requesting station S→capacity
  4G→communication station B→capacity
  4G→communication station E→capacity
  2.5G→D: a minimum capacity value 2.5G number of hop counts 3

Path 3: requesting station S→capacity
  4G→communication station B→capacity
  6G→communication station A→capacity
  4G→communication station C→capacity
  6G→destination station D: a minimum capacity value 4G number of hop counts 4

The result is that the wireless capacity per hop is 1G for the path 3, and since the wireless capacity is a maximum, this is selected. Then, the destination station D sends back a routing reply (RREP) message with respect to the routing request RREQ that arrived from the path 3 and creates a path with the requesting station.

FIG. 11 shows an example of the frame structure of an RREP packet. In the example shown in FIG. 11, the frame structure has a message type field indicating that the associated packet is a routing reply RREP; an information field for path selection; a number-of-hop-counts field for counting the number of hops in the path and describing it; a routing request message ID field for describing information for identifying the message; a communication party (destination) address field for describing information about the requesting station; a communication party (destination) sequence number field; a routing request terminal (source) address field for identifying the routing requesting station; a routing request terminal (source) sequence number field; and a life-time field for indicating the life time of the packet, that is, the time in which the packet can be received.

Here, when the value of a necessary band is transmitted in advance from the node that wants to create a path, that is, from the communication station S, in the routing request packet, or when the value of a necessary band, which is placed in the routing request packet, is transmitted, if all the routing requests RREQ that arrived at the destination station D do not satisfy the requested value, the requesting station D may have a function for sending back a routing error message to the routing reply RREP or a function for explicitly sending back a routing error message packet.

Figure 12:
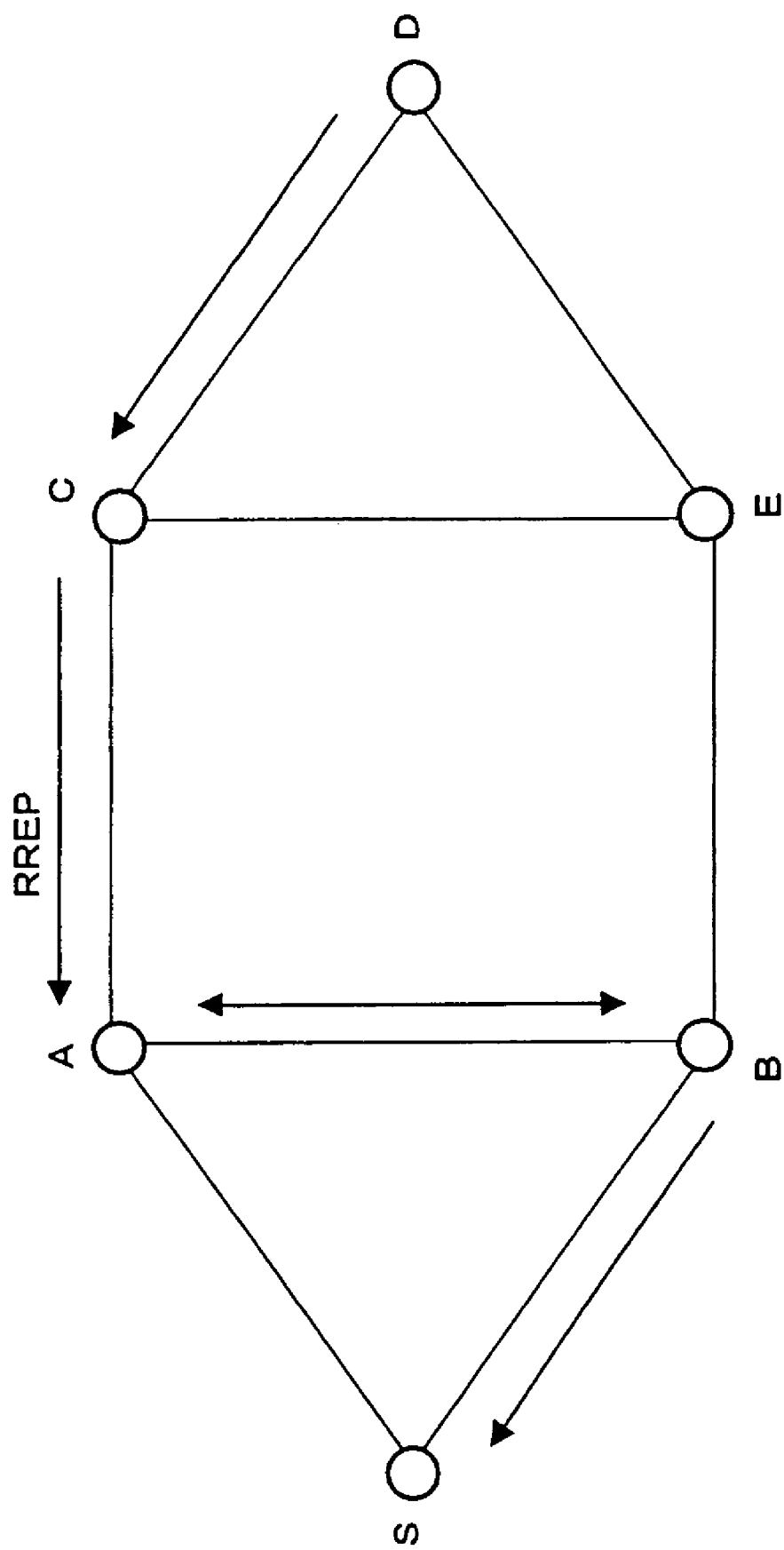
FIG. 12 shows a path when responding to a path creation request in the communication system shown in FIG. 7.

(3-4) Next, the operation when the routing reply (RREP) packet is created and the routing request RREQ is received in the relay station is described by using the communication system configuration shown in FIG. 7 as an example. FIG. 12 shows a path when responding to a path creation request in the communication system shown in FIG. 7. The procedure shown in FIG. 12 is described by also using the flowchart in FIG. 13.

(3-5) As a result of selecting the path 3, the destination station D transmits a routing reply (RREP) packet to the communication station C that has transmitted the routing request packet of the path 3.

Processing (4): Sending Back of Routing Reply RREP (4-1) The communication station C receiving the routing reply (RREP) packet determines whether or not the final destination station (the requesting station S in this case) of the packet is its own station.

(4-2) When the communication station C determines that the final destination station of the packet is not its own station, the communication station C checks the final destination node of the routing reply RREP, refers to the path table held by the communication station itself, selects the next hop destination with respect to the corresponding communication station, and transfers the RREP packet.

(4-3) Furthermore, the communication station C creates a path table for the creator (the destination station D in this case) of the packet, which is described in the RREP sent from the destination station D. In this case, the destination address and the next hop destination address become the same. In the case of the communication station A, the destination is the destination station D, and the next hop destination is the communication station C.

(4-4) As a result of sequentially sending this packet in the order of the communication station C, the communication station A, the communication station B, and the communication station S, a path table for the destination station D is created in each communication station. It follows that the requesting station S that has finally created the routing request packet could create the path up to the destination station D.

(4-5) When each relay station receives an RREP, if the timer 1 for the RREQ packet corresponding thereto is still started up, each relay station stops the timer 1.

Figure 13:
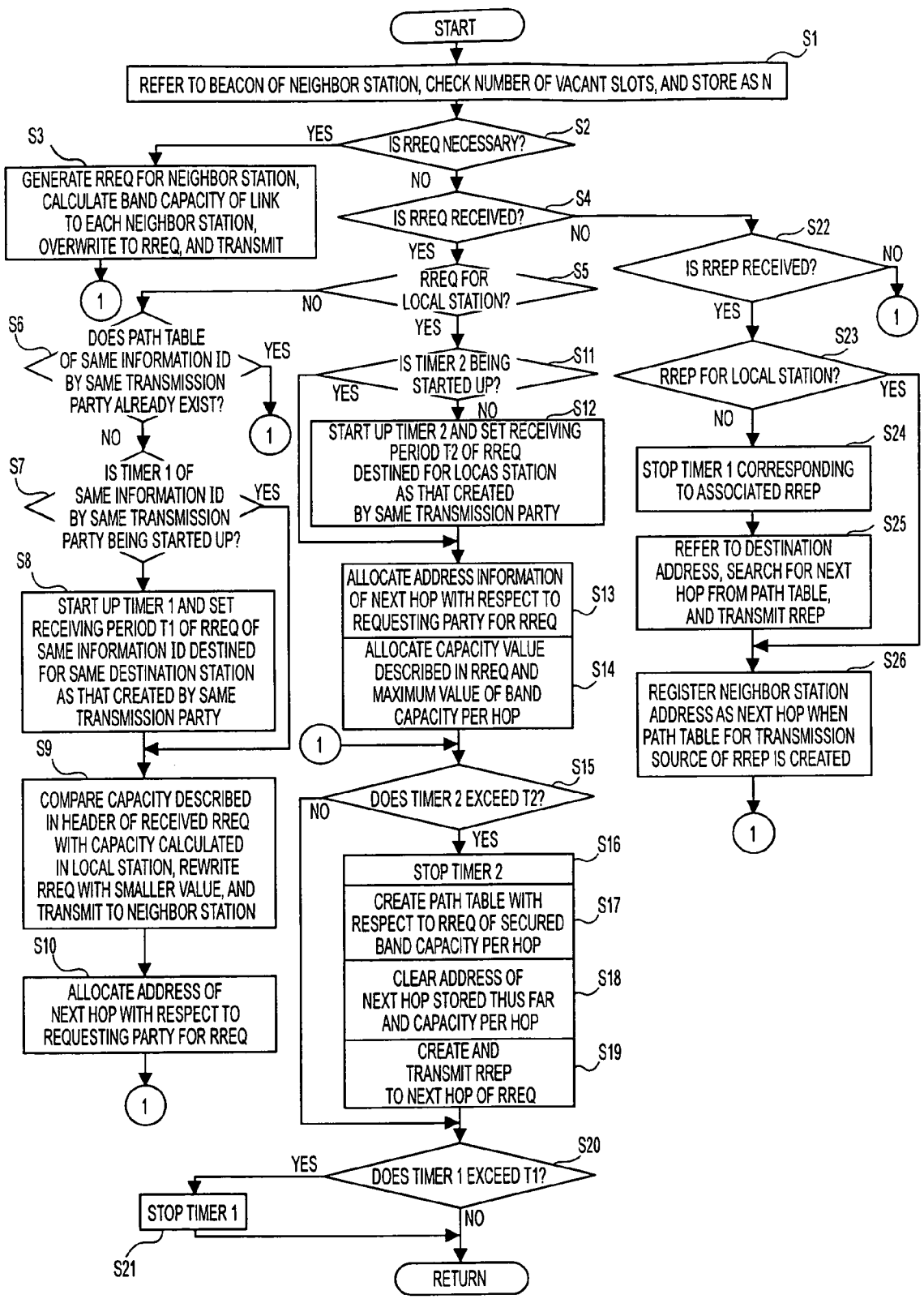
FIG. 13 is a flowchart showing an operation procedure for a communication station to perform multi-hop transmission in the communication system according to the embodiment of the present invention.

FIG. 13 is a flowchart showing an operation procedure for a communication station to perform multi-hop transmission in the communication system according to the embodiment of the present invention. In practice, such an operation procedure is realized in such a manner that, in the wireless communication apparatus 100 that operates as a communication station, the central control section 103 executes a predetermined execution command program stored in an information storage section.

The communication station checks the number of vacant slots on the basis of the beacon information received from the neighbor station and stores it as N (step S1).

Here, when the communication station needs a routing request (step S2), the communication station generates a routing request packet as a unicast packet with respect to each of the neighbor stations, and transmits it (step S3). At that time, by referring to the band (the rate value) of a link to each neighbor station serving as a destination, the communication capacity of the local station is computed in accordance with the above-described equation, and the obtained communication capacity is written into the routing request packet. The packet, to which is added specific capacity information, is transmitted to all the neighbor stations.

When the routing request packet is received (step S4), it is determined whether or not the routing request packet is destined for the local station (that is, whether or not the local station is a destination station) (step S5).

When a routing request packet that is not destined for the local station is received, it is confirmed whether a path for the same information ID destined for the same transmission party exists (step S6). If the path exists, this packet is ignored. If the path does not exist, it is checked whether or not the timer 1 (described above) for the same information ID by the same transmission party is started up (step S7). If the timer 1 is not started up, the timer 1 is started up, and a period T1 in which the routing request packet of the same message ID destined for the same destination station, which is created by the same transmission party, can be realized, is set (step S8).

Then, the communication capacity described in the header of the received routing request packet is compared with the communication capacity of the neighbor station, which is calculated by the local station. The routing request packet is rewritten with the smaller value. Then, the routing request packet is transmitted to all the neighbor stations (step S9).

Next, in order to create a reverse path for the transmission party of the routing request packet, the address information of the next hop for the requesting party of the routing request packet is stored in the memory (step S10).

When a routing request packet destined for the local station is received (step S5), here, it is checked whether or not the timer 2 (described above) for the routing request RREQ of the same message ID by the same transmission party is started up (step S11). Then, when the timer 2 is not started up, the timer 2 is started up, and a period T2, in which the routing request packet of the same message ID destined for the local station, which is created by the same transmission party, can be received, is set (step S12).

Next, in order to create a reverse path for the transmission party of the routing request packet, the address information of the next hop of the requesting party of the routing request packet is stored in the memory (step S13).

Next, the band capacity per hop is calculated on the basis of the communication capacity described in the received routing request packet and the number of hop counts, and the maximum capacity value among the routing request packets received thus far is stored in the memory (step S14).

When the routing request packet is not received (step S4), then, it is checked whether or not the routing reply packet is received (step S22). Then, when the routing reply packet is received, it is further checked whether or not the routing reply packet is destined for the local station (step S23).

When the routing request packet that is not destined for the local station is received, if the timer 1 corresponding to the routing request packet is started up, the timer 1 is stopped (step S24). Then, by referring to the destination address of the packet, the next hop is searched for from the path table, and the routing reply packet is transferred to the communication station (step S25)

After the processing of the routing reply packet that is not destined for the local station is completed or when the routing reply packet that is destined for the local station is received in the manner described above, when creating a path table for the transmission source (Source) that has sent the routing reply packet, the address of the neighbor station that has sent the packet is registered as the next hop (step S26).

When the processing of the routing reply packet that is not destined for the local station is completed, when the processing of the routing request destined for the local station is completed, or when neither the routing request packet nor the routing reply packet is received, it is checked whether or not the timer 2 exceeds T2 (step S15).

When the timer 2 exceeds T2, the timer 2 is stopped (step 16). A path table is created for the routing request RREQ of the band capacity per hop in the memory with respect to the routing request RREQ corresponding to the timer 2 (step S17). The memory of the next hop address stored thus far and the communication capacity per hop are cleared (step S18). Furthermore, a routing reply RREP is created and is transmitted to the next hop destination of the routing request RREQ (step S19).

Here, it is checked whether or not the timer 1 exceeds T1 (step S20). Then, if the timer 1 does not exceed T1, the processing routine is completed. When the timer 1 exceeds T1, the timer 1 is stopped (step S21), and the processing routine is completed.

Figure 14:
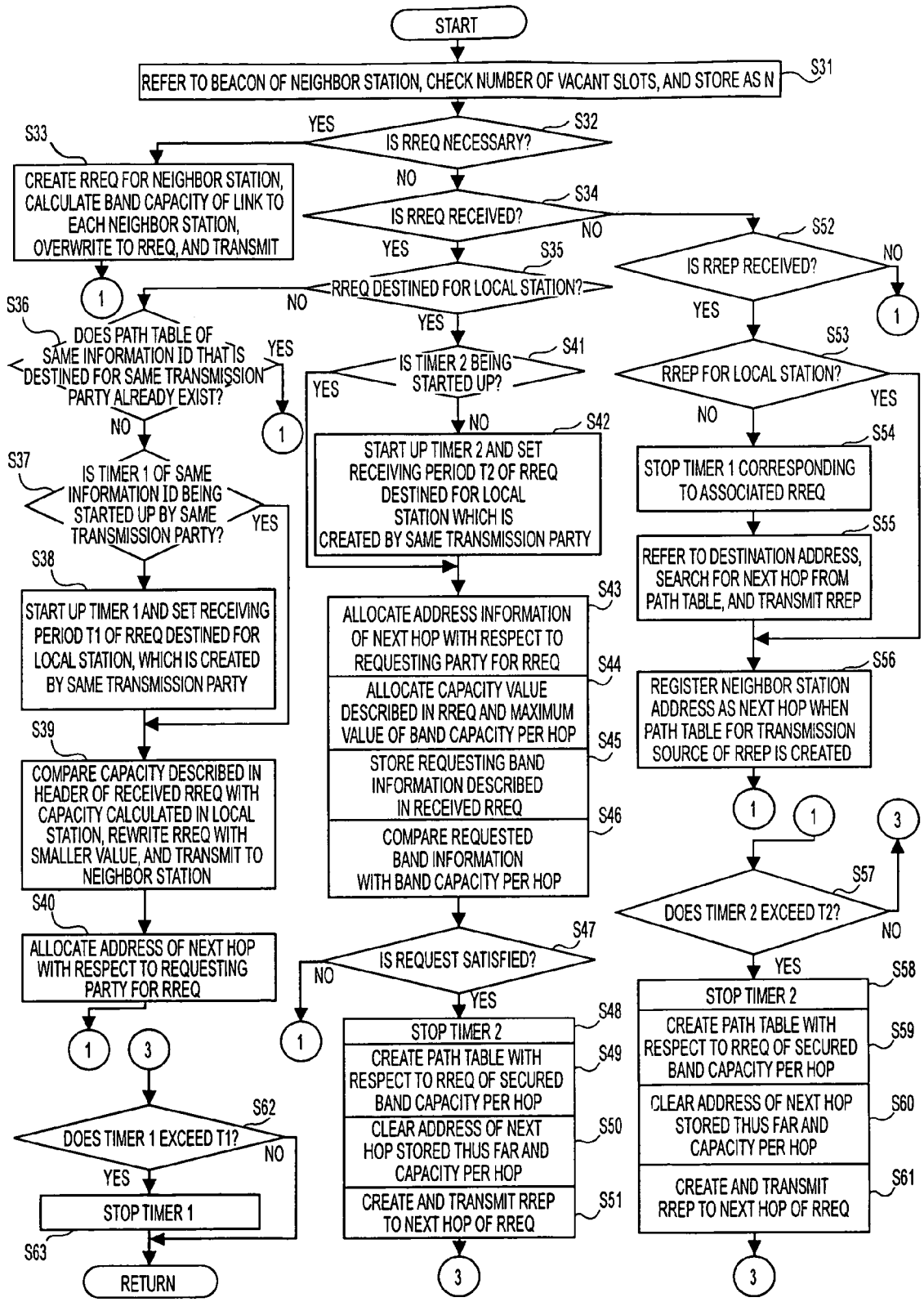
FIG. 14 is a flowchart showing an operation procedure for a communication station to perform multi-hop transmission in the communication system according to the embodiment of the present invention.

FIG. 14 is a flowchart showing another operation procedure for a communication station to perform multi-hop transmission in the communication system according to the embodiment of the present invention. In the operation procedure shown in FIG. 14, when the communication station finds a band requested by the transmission party within a specified time, the communication station selects the path. In practice, such an operation procedure is realized in such a manner that, in the wireless communication apparatus 100 that operates as a communication station, the central control section 103 executes a predetermined execution command program stored in the information storage section.

Based on the beacon information received from the neighbor station, the communication station checks the number of vacant slots and stores it as N (step S31).

Here, when the communication station needs a routing request (step S32), a routing request packet is created as a unicast packet and is transmitted to each neighbor station (step S33). At that time, by referring to the band (the rate value) of a link to each neighbor station serving as a destination, the communication capacity of the local station is computed in accordance with the above-described equation, and the obtained communication capacity is written into the routing request packet. The packet, to which is added specific capacity information, is transmitted to all the neighbor stations.

Furthermore, when the routing request packet is received (step S34), it is determined whether or not the routing request packet is destined for the local station (that is, whether or not the local station is a destination station) (step S35).

When a routing request packet that is not destined for the local station is received, it is confirmed whether a path for the same information ID destined for the same transmission party exists (step S36). If the path exists, this packet is ignored. If the path does not exist, it is checked whether or not the timer 1 (described above) for the same information ID by the same transmission party is started up (step S37). If the timer 1 is not started up, the timer 1 is started up, and a period T1 in which the routing request packet of the same message ID destined for the same destination station, created by the same transmission party, can be received, is set (step S38).

Then, the communication capacity described in the header of the received routing request packet is compared with the communication capacity of the neighbor station, which is calculated by the local station. The routing request packet is rewritten with the smaller value. Then, the routing request packet is transmitted to all the neighbor stations (step S39).

Next, in order to create a reverse path for the transmission party of the routing request packet, the address information of the next hop for the requesting party of the routing request packet is stored in the memory (step S40).

When a routing request packet destined for the local station is received (step S35), here, it is checked whether or not the timer 2 (described above) for the routing request RREQ of the same message ID by the same transmission party is started up (step S41). Then, when the timer 2 is not started up, the timer 2 is started up, and a period T2, in which the routing request packet of the same message ID destined for the local station, which is created by the same transmission party, can be received, is set (step S42).

Next, in order to create a reverse path for the transmission party of the routing request packet, the address information of the next hop of the requesting party of the routing request packet is stored in the memory (step S43).

Next, the band capacity per hop is calculated on the basis of the communication capacity described in the received routing request packet and the number of hop counts, and the maximum capacity value among the routing request packets received thus far is stored in the memory (step S44).

Next, the band information requested from the requesting station, which is described in the received routing request packet, is stored in the memory (step S45). Then, the band capacity requested from the requesting station is compared with the band capacity per hop in the associated path, which is calculated on the basis of the description of the routing request packet (step S46).

Here, if the request for the band capacity of the requesting station is satisfied (step S47), the timer 2 is stopped (step S48). Then, with respect to the routing request RREQ of the band capacity per hop, which is stored in the memory, a path table is created (step S49). The memory of the next hop address stored thus far and the communication capacity per hop are cleared (step S50). Furthermore, a routing reply RREP is created and is transmitted to the next hop destination of the routing request RREQ (step S51).

When the routing request packet is not received (step S34), then, it is checked whether or not the routing reply packet is received (step S52). Then, when the routing reply packet is received, it is further checked whether or not the routing reply packet is-destined for the local station (step S53).

When the routing request packet that is not destined for the local station is received, if the timer 1 corresponding to the routing request packet is started up, the timer 1 is stopped (step S54). Then, by referring to the destination address of the packet, the next hop is searched for from the path table, and the routing reply packet is transferred to the communication station (step S55)

After the processing of the routing reply packet that is not destined for the local station is completed or when the routing reply packet that is destined for the local station is received in the manner described above, when creating a path table for the transmission source (Source) that has sent the routing reply packet, the address of the neighbor station that has sent the packet is registered as the next hop (step S56).

When the processing of the routing reply packet that is not destined for the local station is completed, when the routing request packet destined for the local station is received, but a path that satisfies the band capacity requested by the requesting station could not be found, when the processing of the routing request destined for the local station is completed, or when neither the routing request packet nor the routing reply packet is received, it is checked whether or not the timer 2 exceeds T2 (step S57).

When the timer 2 exceeds T2, the timer 2 is stopped (step 58). A path table is created for the routing request RREQ of the band capacity per hop in the memory (step S59). The memory of the next hop address stored thus far and the communication capacity per hop are cleared (step S60). Furthermore, a routing reply RREP is created and is transmitted to the next hop destination of the routing request RREQ (step S61).

After the routing reply RREP for the routing request RREQ destined for the local station is transmitted, or after the routing reply RREP for the routing request RREQ that is not destined for the local station is transmitted, it is checked whether or not the timer 1 exceeds T1 (step S62). Then, if the timer 1 does not exceed T1, the processing routine is completed. When the timer 1 exceeds T1, the timer 1 is stopped (step S63), and the processing routine is completed.

Figure 15:
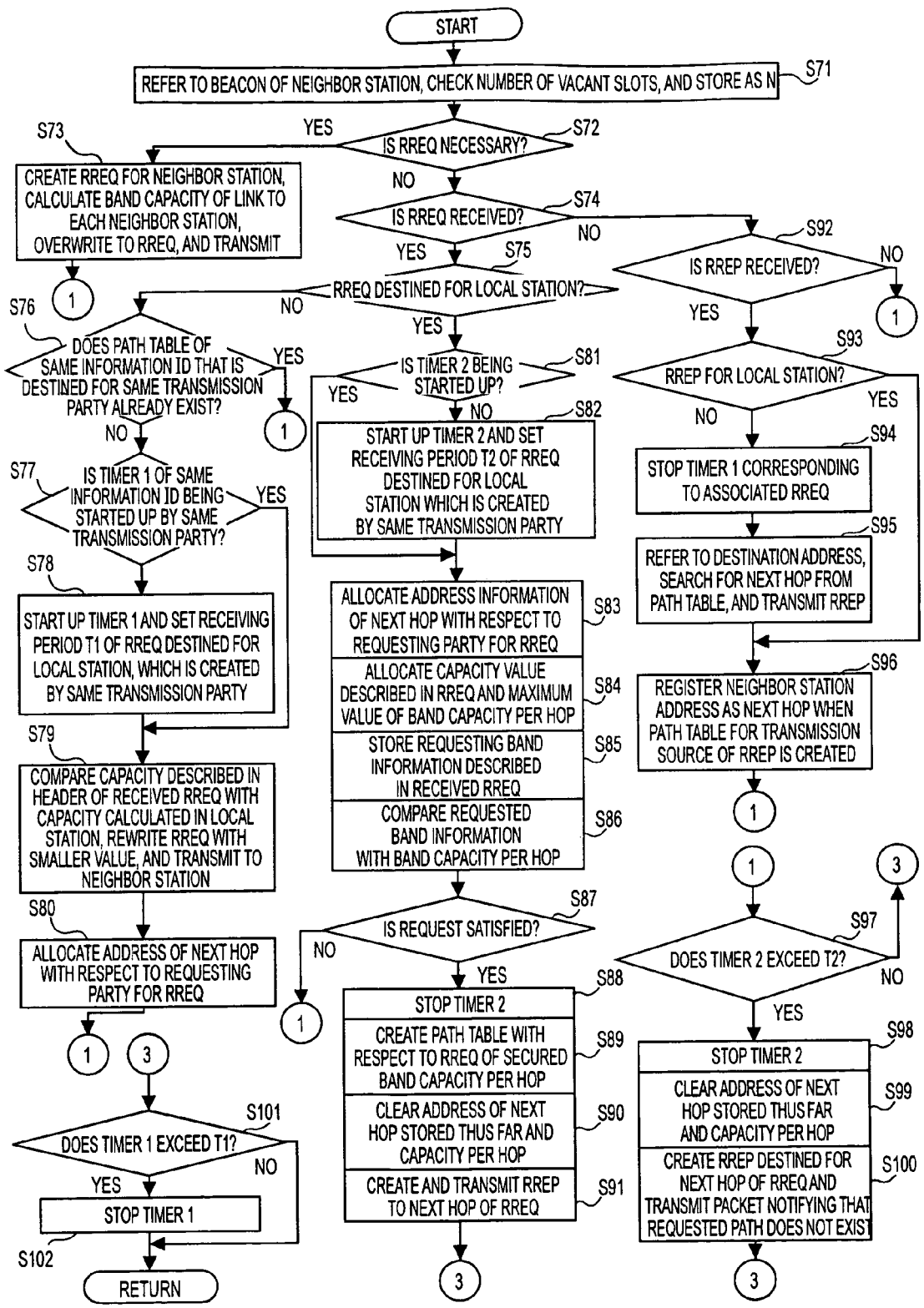
FIG. 15 is a flowchart showing an operation procedure for a communication station to perform multi-hop transmission in the communication system according to the embodiment of the present invention.

FIG. 15 is a flowchart showing another operation procedure for a communication station to perform multi-hop transmission in the communication system according to the embodiment of the present invention. In the operation procedure shown in FIG. 15, if it is difficult for the communication station to find a path that satisfies the request within a specified time, the destination station explicitly reports to the requesting station that the path does not exist. In practice, such an operation procedure is realized in such a manner that, in the wireless communication apparatus 100 that operates as a communication station, the central control section 103 executes a predetermined execution command program stored in an information storage section.

The communication station checks the number of vacant slots on the basis of the beacon information received from the neighbor station, and stores it as N (step S71).

Here, when the communication station needs a routing request (step S72), the communication station generates a routing request packet as a unicast packet with respect to each of the neighbor stations, and transmits it (step S73). At that time, by referring to the band (rate value) of a link to each neighbor station serving as a destination, the communication capacity of the local station is computed in accordance with the above-described equation, and the obtained communication capacity is written into the routing request packet. The packet, to which specific capacity information is added, is transmitted to all the neighbor stations.

When the routing request packet is received (step S74), it is determined whether or not the routing request packet is destined for the local station (that is, whether or not the local station is a destination station) (step S75).

When a routing request packet that is not destined for the local station is received, it is confirmed whether a path for the same information ID destined for the same transmission party exists (step S76). If the path exists, this packet is ignored. If the path does not exist, it is checked whether or not the timer 1 (described above) for the same information ID by the same transmission party is started up (step S77). If the timer 1 is not started up, the timer 1 is started up, and a period T1 in which the routing request packet of the same message ID destined for the same destination station, which is created by the same transmission party, can be received, is set (step S78).

Then, the communication capacity described in the header of the received routing request packet is compared with the communication capacity of the neighbor station, which is calculated by the local station. The routing request packet is rewritten with the smaller value. Then, the routing request packet is transmitted to all the neighbor stations (step S79).

Next, in order to create a reverse path for the transmission party of the routing request packet, the address information of the next hop for the requesting party of the routing request packet is stored in the memory (step S80).

When a routing request packet destined for the local station is received (step S75), here, it is checked whether or not the timer 2 (described above) for the routing request RREQ of the same message ID by the same transmission party is started up (step S81). Then, when the timer 2 is not started up, the timer 2 is started up, and a period T2, in which the routing request packet of the same message ID destined for the local station, which is created by the same transmission party, can be received, is set (step S82).

Next, in order to create a reverse path for the transmission party of the routing request packet, the address information of the next hop of the requesting party of the routing request packet is stored in the memory (step S83).

Next, the band capacity per hop is calculated on the basis of the communication capacity described in the received routing request packet and the number of hop counts, and the maximum capacity value among the routing request packets received thus far is stored in the memory (step S84).

Next, the band information requested from the requesting station, which is described in the received routing request packet, is stored in the memory (step S85). Then, the band capacity requested from the requesting station is compared with the band capacity per hop in the associated path, which is calculated on the basis of the description of the routing request packet (step S86).

Here, if the request for the band capacity from the requesting station is satisfied (step S87), the timer 2 is stopped (step S88). Then, with respect to the routing request RREQ of the band capacity per hop, which is stored in the memory, a path table is created (step S89). The memory of the next hop address stored thus far and the communication capacity per hop are cleared (step S90). Furthermore, a routing reply RREP is created and is transmitted to the next-hop destination of the routing request RREQ (step S92).

When the routing request packet is not received (step S74), then, it is checked whether or not the routing reply packet is received (step S92). Then, when the routing reply packet is received, it is further checked whether or not the routing reply packet is destined for the local station (step S93).

When the routing request packet that is not destined for the local station is received, if the timer 1 corresponding to the routing request packet is started up, the timer 1 is stopped (step S94). Then, by referring to the destination address of the packet, the next hop is searched for from the path table, and the routing reply packet is transferred to the communication station (step S95)

After the processing of the routing reply packet that is not destined for the local station is completed or when the routing reply packet that is destined for the local station is received in the manner described above, when creating a path table for the transmission source (Source) that has sent the routing reply packet, the address of the neighbor station that has sent the packet is registered as the next hop (step S96).

When the processing of the routing reply packet that is not destined for the local station is completed, when the routing request packet destined for the local station is received, but a path that satisfies the band capacity requested by the requesting station could not be found, when the processing of the routing reply packet is completed, or when neither the routing request packet nor the routing reply packet is received, it is checked whether or not the timer 2 exceeds T2 (step S97).

When the timer 2 exceeds T2, the timer 2 is stopped (step 98). The memory of the next hop address stored thus far and the communication capacity per hop are cleared (step S99). Furthermore, a routing reply RREP is created with respect to the next hop destination of the routing request RREQ, and a packet indicating that the requested path does not exist is transmitted (step S100).

After the routing reply RREP for the routing request RREQ destined for the local station is transmitted, after a routing reply RREP for a routing reply RREQ that is not destined for the local station is transmitted, or after the packet indicating that the requested path does not exist is transmitted, it is checked whether or not the timer 1 exceeds T1 (step S101). Then, if the timer 1 does not exceed T1, the processing routine is completed. When the timer 1 exceeds T1, the timer 1 is stopped (step S102), and the processing routine is completed.

In this specification, by using as main embodiments a case in which the present invention is applied in a communication environment in which each communication station broadcasts beacons for each predetermined frame period in an autonomously distributed wireless network, the embodiments of the present invention have been discussed above. However, the gist of the present invention is not limited to these embodiments. For example, in an autonomously distributed network that is not based on the exchange of beacon signals and in a network in which each communication station operates under centralized management by control stations, by applying the present invention, it is possible to realize multi-hop transmission for performing routing, in which the improvement in the frequency usage efficiency is set as metrics by considering the communication capacity in each path.

In summary, the present invention has been disclosed in the form of examples, and the description content of this specification should not be construed as being limited. In order to determine the gist of the present invention, the claims should be taken into consideration.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system for performing multi-hop transmission between stations, the wireless communication system comprising:
   a requesting station for requesting multi-hop transmission;
   a destination station which receives the request from the requesting station; and
   neighbor stations,
   wherein the requesting station determines a communication capacity for each neighbor station of the requesting station and transmits a routing request message in which communication capacity information is described to each neighbor station of the requesting station,
   each neighbor station that receives the routing request message transmits the routing request message to each of its own neighbor stations, and
   based on the communication capacity information described in the routing request message received from each neighbor station of the destination station, the destination station determines which routing request message to respond to and performs routing.

2. The wireless communication system according to claim 1, wherein each communication station handles, as the communication capacity information, effective rate information for each section that connects neighbor stations in the path.

3. The wireless communication system according to claim 2, wherein the communication station sets, as the communication capacity in each section, a value such that the effective rate set with each neighbor station is multiplied by the amount of a vacant band.

4. The wireless communication system according to claim 1, wherein a relay station receiving a routing request message updates the communication capacity information and transfers the communication capacity information to each neighbor station.

5. The wireless communication system according to claim 1, wherein a relay station receiving a routing request message computes the communication capacity in each section by multiplying the effective rate set with each neighbor station by the amount of the vacant band, and replaces the communication capacity with a communication capacity computed in the local station when the computed communication capacity in each section is smaller than the communication capacity described in the routing request message.

6. The wireless communication system according to claim 1, wherein the destination station refers to the communication capacity information described in the routing request message received from each neighbor station, sends back a routing reply message with respect to the routing request message for which a band with the largest communication capacity can be ensured, and creates a path with the requesting station.

7. The wireless communication system according to claim 1, wherein the destination station divides the communication capacity described in the routing request message received from each neighbor station by the number of hops, sends back a routing reply message with respect to the routing request message for which the communication capacity per hop becomes a maximum, and creates a path with the requesting station.

8. The wireless communication system according to claim 1, wherein the requesting station transmits a routing request message in which an expected communication capacity is described, and the destination station waits for a predetermined time for the arrival of a routing request message in which communication capacity information that satisfies the communication capacity expected by the requesting station is described, sends back a routing reply message if the routing request message in which communication capacity information that satisfies the communication capacity expected by the requesting station is described is received, and creates a path with the requesting station.

9. The wireless communication system according to claim 8, wherein the destination station waits for a predetermined time for the arrival of a routing request message, and sends back a response message that a path that satisfies the request could not be found by using at least one of the routing request messages that were received thus far when a routing request message in which capacity information that satisfies the communication capacity expected by the requesting station is described could not be received.

10. A requesting wireless communication apparatus for performing communication operations with a destination wireless communication apparatus in a communication environment in which multi-hop transmission is performed, the requesting wireless communication apparatus comprising:
  a communication section performing transmission and reception in a transmission path; and
  a communication control section controlling communication operations in the communication section,
  wherein the communication control section of the requesting wireless communication apparatus selects a path during multi-hop transmission on the basis of communication capacity information received from each neighbor station.

11. The requesting wireless communication apparatus according to claim 10, wherein the communication control section handles, as the communication capacity information, effective rate information for each section that connects neighbor stations in the path.

12. The requesting wireless communication apparatus according to claim 10, wherein the communication control section sets, as the communication capacity in each section, a value such that the effective rate set with each neighbor station is multiplied by the amount of a vacant band.

13. The requesting wireless communication apparatus according to claim 10, wherein, when operating as a requesting station for multi-hop transmission, the communication control section transmits, to each neighbor station, a routing request message in which the communication capacity information determined for each neighbor station is described.

14. The requesting wireless communication apparatus according to claim 13, wherein, when a routing request message that is not destined for a receiving neighbor station is received, the communication control section of the receiving neighbor station updates the communication capacity information and transfers the routing request message to each of its neighbor stations.

15. The requesting wireless communication apparatus according to claim 14, wherein the communication control section of the receiving neighbor station computes a communication capacity in each section by multiplying the effective rate set with each of its neighbor stations by the amount of a vacant band, and replaces the received communication capacity information with the computed communication capacity when the computed communication capacity in each section is smaller than the received communication capacity information described in the received routing request message.

16. The requesting wireless communication apparatus according to claim 13, wherein, when a routing request message destined for a receiving neighbor station is received, the communication control of the receiving neighbor station refers to the communication capacity information described in the routing request message received from each neighbor station, sends back a routing reply message with respect to the routing request message for which a band with the largest communication capacity can be ensured, and creates a path with the requesting station.

17. The requesting wireless communication apparatus according to claim 13, wherein, when a routing request message destined for a receiving neighbor station is received, the communication control section of the receiving neighbor station divides the communication capacity described in the routing request message received from its neighbor stations by the number of hops, sends back a routing reply message with respect to the routing request message for which the communication capacity per hop becomes a maximum, and creates a path with the requesting station.

18. The requesting wireless communication apparatus according to claim 13, wherein, when the communication capacity expected by the requesting station is described in the routing request message destined for a receiving neighbor station, the communication control section of the receiving neighbor station waits for a predetermined time for the arrival of the routing request message in which communication capacity information that satisfies the communication capacity expected by the requesting station is described, sends back a routing reply message if the routing request message in which the communication capacity information that satisfies the communication capacity expected by the requesting station is described is received, and creates a path with the requesting station.

19. The requesting wireless communication apparatus according to claim 18, wherein, when the receiving neighbor station waits for a predetermined time for the arrival of the routing request message and a routing request message in which communication capacity information that satisfies the communication capacity expected by the requesting station is described cannot be received, the communication control section of the receiving neighbor station sends back a response message that a path that satisfies the request could not be found by using at least one of the routing request messages that were received from its neighbors thus far.

20. A wireless communication method for performing communication operations in a communication environment in which multi-hop transmission is performed, the wireless communication method comprising the steps of:
  computing communication capacity information for each neighbor station;
  transmitting, to each neighbor station, a routing request message in which the communication capacity information determined for each neighbor station is described when operating as a requesting station for multi-hop transmission;
  updating, at each neighbor station that receives a routing request message that is not destined for that neighbor station, the communication capacity information and transferring the routing request message to each of its neighbor stations; and
  referring to the communication capacity information described in the routing request message received from each neighbor station when sending back a routing reply message corresponding to the routing request message to choose a band with the largest communication capacity, and creating a path with the requesting station.

21. A computer-readable medium including computer executable instructions, wherein the instructions, when executed by a processor, cause the processor to perform a method comprising the steps of:

computing communication capacity information for each neighbor station;

transmitting, to each neighbor station, a routing request message in which the communication capacity information determined for each neighbor station is descibed when operating as a requesting station for multi-hop transmission;

updating, at each neighbor station that receives a routing request message that is not destined for that neighbor station, the communication capacity information and transferring the routing request message to each of its neighbor stations; and referring to the communication capacity information described in the routing request message received from each neighbor station when sending back a routing reply message corresponding to the routing request message to choose a band with the largest communication capacity, and creating a path with the requesting station.

* * * * *

UNITED STATES PATENT AND TRADEMARK OFFICE
CERTIFICATE OF CORRECTION

PATENT NO. : 7,561,525 B2  Page 1 of 1
APPLICATION NO. : 11/150229
DATED : July 14, 2009
INVENTOR(S) : Shin Saito It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 278 days.

should read (*) Notice: Subject to any disclaimer, the term of this patent is extended or adjusted under 35 U.S.C. 154(b) by 513 days.

Signed and Sealed this

Twentieth Day of April, 2010

David J. Kappos
*Director of the United States Patent and Trademark Office*